(12) United States Patent  
Gray et al.

(10) Patent No.: US 8,010,643 B2  
(45) Date of Patent: Aug. 30, 2011

(54) SYSTEM AND METHODS FOR SIMULATING TRAFFIC GENERATION

(75) Inventors: Eric W. Gray, Lee, NH (US); Navneeth N. Kannan, Westford, MA (US)

(73) Assignee: OPNET Technologies Inc, Bethesda, MD (US)

( * ) Notice: Subject to any disclaimer, the term of this patent is extended or adjusted under 35 U.S.C. 154(b) by 2209 days.

(21) Appl. No.: 10/903,585

(22) Filed: Aug. 2, 2004

(65) Prior Publication Data

US 2005/0108379 A1    May 19, 2005

Related U.S. Application Data

(60) Provisional application No. 60/491,566, filed on Aug. 1, 2003, provisional application No. 60/577,165, filed on Jun. 7, 2004.

(51) Int. Cl.  
*G06F 15/173* (2006.01)

(52) U.S. Cl. .................. 709/223; 709/224; 370/252

(58) Field of Classification Search .................. 709/223, 709/224; 370/252  
See application file for complete search history.

(56) References Cited

U.S. PATENT DOCUMENTS

| | | | | |
|---|---|---|---|---|
| 5,881,237 | A * | 3/1999 | Schwaller et al. | 709/224 |
| 6,026,442 | A * | 2/2000 | Lewis et al. | 709/229 |
| 6,272,450 | B1 * | 8/2001 | Hill et al. | 703/13 |
| 6,408,335 | B1 * | 6/2002 | Schwaller et al. | 709/224 |
| 6,442,615 | B1 * | 8/2002 | Nordenstam et al. | 709/241 |
| 2004/0032857 | A1 * | 2/2004 | Tannan | 370/351 |
| 2004/0098421 | A1 * | 5/2004 | Peng | 707/203 |
| 2004/0240387 | A1 * | 12/2004 | Nuzman et al. | 370/252 |
| 2005/0169185 | A1 * | 8/2005 | Qiu et al. | 370/241 |
| 2005/0204028 | A1 * | 9/2005 | Bahl et al. | 709/223 |

* cited by examiner

*Primary Examiner* — Liangche A Wang  
(74) *Attorney, Agent, or Firm* — Robert N. McDermott

(57) ABSTRACT

Systems and methods are disclosed for simulating network performance. In one exemplary embodiment, the method includes inferring one or more services on the network; collecting network information based on actual traffic on the network; determining a traffic generator, such that the traffic generator represents the actual traffic on the network from a perspective of at least one of the inferred services; and simulating performance of the network using the determined traffic generator and at least one of the inferred services.

21 Claims, 20 Drawing Sheets

SYSTEM AND METHODS FOR SIMULATING TRAFFIC GENERATION

CROSS REFERENCE TO RELATED APPLICATION

This application claims the benefit of priority to U.S. provisional application No. 60/491,566, filed Aug. 1, 2003, entitled "SYSTEMS AND METHODS FOR INFERRING SERVICES ON A NETWORK", and to U.S. provisional application No. 60/577,165, filed Jun. 7, 2004, entitled "SYSTEMS AND METHODS FOR INTELLIGENT PROBE TESTING", both of which are expressly incorporated by reference herein in their entirety.

BACKGROUND OF THE INVENTION

I. Field of the Invention

The present invention generally relates to communication systems and, in particular, to systems and methods for utilizing inferred services.

II. Background and Material Information

Because of the Internet's global reach, the Internet has become a universal communications medium for businesses. With distance-independent rates and flat fees, the cost of communicating over the Internet is drastically cheaper when compared to the cost of the traditional public switched telephone network (PSTN). Indeed, businesses are rapidly deploying all of their communications to the Internet, including voice traffic, which has been the exclusive domain of the PSTN.

With the advent and ubiquity of the Internet, virtual private networks (VPN) have emerged as a way to build a private communication network over a shared public or private infrastructure, which serves as a base network. In essence, a VPN is a service providing a private network on a public network infrastructure, such as the Internet. A service is a function provided to users and/or processors of a network. A virtual private network is "virtual" because it is logically separated from other traffic on the Internet. It is also "private" since the information that is exchanged between users may be encrypted or encoded to provide privacy. VPNs provide secure private connections over the Internet by enabling authentication of users and locations, delivering secure and private "tunnels" between users or locations, and encrypting user communications. Some VPNs offer performance guarantees (e.g., packet loss, latency, availability), which are referred to as Quality of Service (QoS) guarantees (also known as Service Level Agreements (SLAs)).

To address the demand for VPN services, network manufacturers are rapidly building VPN capabilities into routers and other networking equipment. Indeed, VPNs are supported by a multi-vendor mix of switches, routers, and transport equipment, all of which include a wide variety of complex protocols and technologies. The diverse nature of the hardware and protocols makes integration and network management a true challenge. Moreover, without effective management tools, service providers offering VPN services have difficulty managing their VPNs to the degree necessary to guarantee quality of service (QoS) contracts with their customers. As such, there is a need to provide systems and methods for managing services, such as VPN services.

SUMMARY OF THE INVENTION

The present invention is directed to systems and methods for utilizing inferred services.

Systems and methods consistent with one embodiment of the present invention receive topologically relevant network information concerning nodes, interfaces, connections and/or protocols; resolve conflicts in the received information; determine and store a network topology from the received and resolved information; and infer one or more services based on the stored topology.

In another embodiment, a replay of stored network information is provided, including receiving network information at a predetermined time; storing network information based on the predetermined time; detecting an event at a time other than the predetermined time; receiving network information based on the event; and storing network information based on the event.

In another embodiment, systems and methods are provided for simulating network performance. Systems and methods consistent with the embodiment of the invention may infer one or more services on the network. Moreover, systems and methods consistent with the embodiment of the invention may collect network information based on actual traffic on the network. Furthermore, systems and methods consistent with the embodiment of the invention may determine a traffic generator, such that the traffic generator represents the actual traffic on the network from a perspective of at least one of the inferred services. In addition, systems and methods consistent with the embodiment may simulate performance of the network using the determined traffic generator and at least one of the inferred services.

Additional features and advantages of various embodiments may be realized and attained by the systems and methods particularly described in the written description, the appended drawings, and the claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Reference will now be made in detail to embodiments of the invention, examples of which are illustrated in the accompanying drawings and described in the specification. Wherever possible, the same reference numbers will be used throughout the drawings to refer to the same or like parts.

Figure 1:
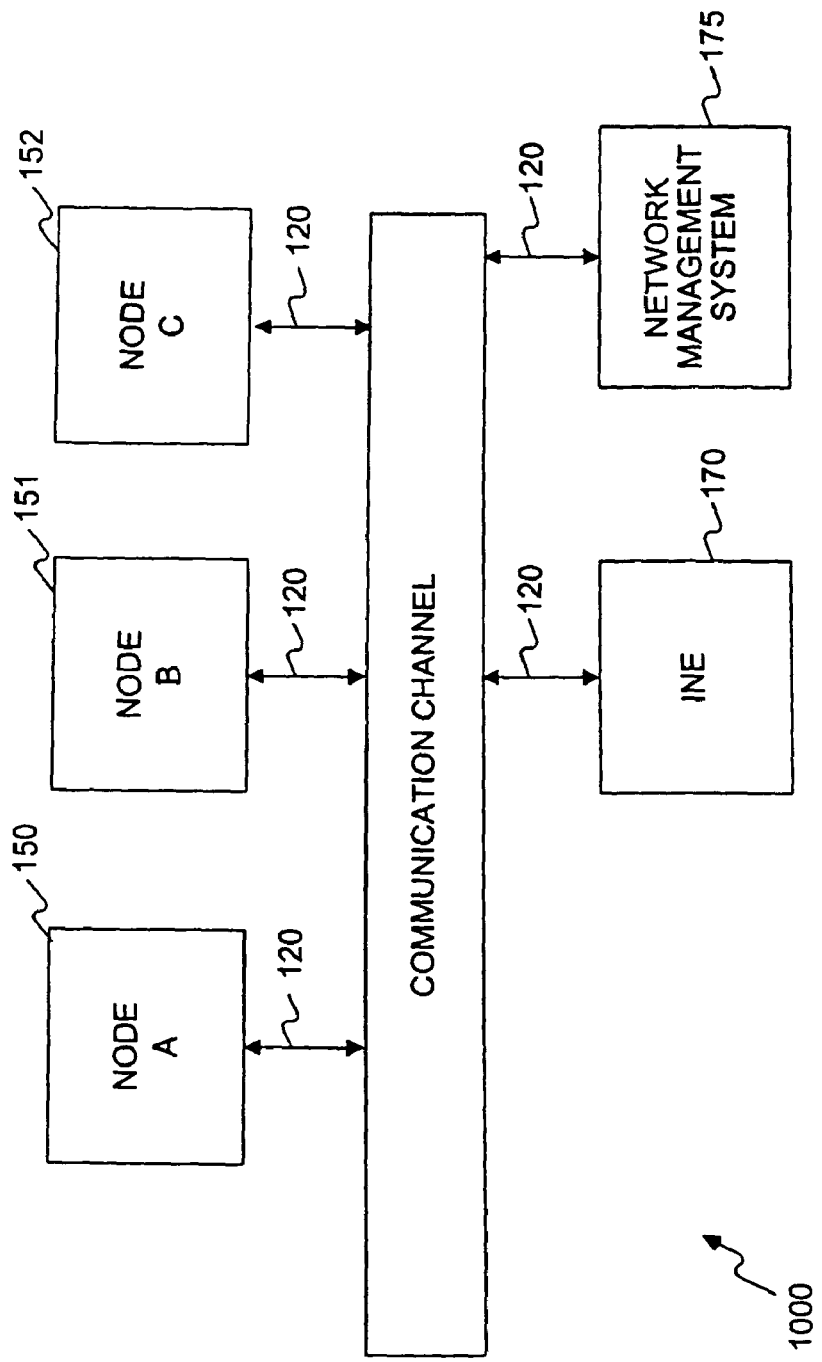
FIG. 1 illustrates an exemplary network environment.

FIG. 1 depicts an exemplary network environment 1000 consistent with one embodiment of the present invention. Referring to FIG. 1, the network environment 1000 includes one or more nodes A-C 150-152 connected by a communication channel 120 to an Intelligent Network Element (INE) 170 and a Network Management System (NMS) 175, all of which will be described in greater detail below.

Each of nodes A-C 150-152 represents a point on the network and may be embodied as a data processor, such as a router, a switch, a gateway, or any other communication or data processing device.

Communication channel 120 may function as a communication network (or links) and may include, alone or in any suitable combination a telephony-based network, a local area network (LAN), a wide area network (WAN), a dedicated intranet, the Internet, a wireless network, or a bus. Further, any suitable combination of wired and/or wireless components and systems may be incorporated into the communication channels. The term "network" means a system of interconnected nodes including corresponding links and may include one or more of the components depicted in network environment 1000. As used herein, a connection means a path, such as a link.

Intelligent Network Element (INE) 170 participates in a network by, for example, receiving information, such as statistics, event information (e.g., network failures), and topology information (e.g., interfaces, links, and routes to other nodes). INE 170 may be embodied as a data processor that poses as a router but does not forward packets to a destination computer. Moreover, from the perspective of nodes A-C 150-152, INE 170 may appear as another node, e.g., a router. As such, nodes A-C 150-152 provide information to INE 170 as if INE 170 were any other node (or router) in network environment 1000.

Network Management System (NMS) 175 may be embodied by one or more data processors. NMS 175 may function to infer one or more services on network 1000 and to manage network 1000. One of ordinary skill in the art would recognize that network management includes the execution of one or more functions for controlling, planning, allocating, deploying, coordinating, and/or monitoring the resources of a telecommunications network. Moreover, when a plurality of INEs are present in a network, NMS 175 may aggregate information provided by the INEs and use that aggregate information to infer one or more services on the network. An inferred service may correspond to a virtual private network between nodes, such as node A 150 and node B 151. NMS 175 may be able to infer that one or more virtual private network services exist between nodes 150 and 151 by, for example, detecting route targets exported by node A 150 and/or node B 151. See for example RFC-2547, E. Rosen et al., The Internet Society (1999), "BGP/MPLS VPNs," that describes route targets and BGP/MPLS (Border Gateway Protocol/Multiprotocol Label Switching) VPNs (draft-ietf-l3vpn-rfc2547bis-01.txt, E. Rosen et al., The Internet Society, September 2003, "BGP/MPLS IP VPNs). In addition to layer-3 type VPNs, such as BGP/MPLS VPNs, other types of VPNs may by inferred including, for example, layer-2 VPNs.

Figure 2:
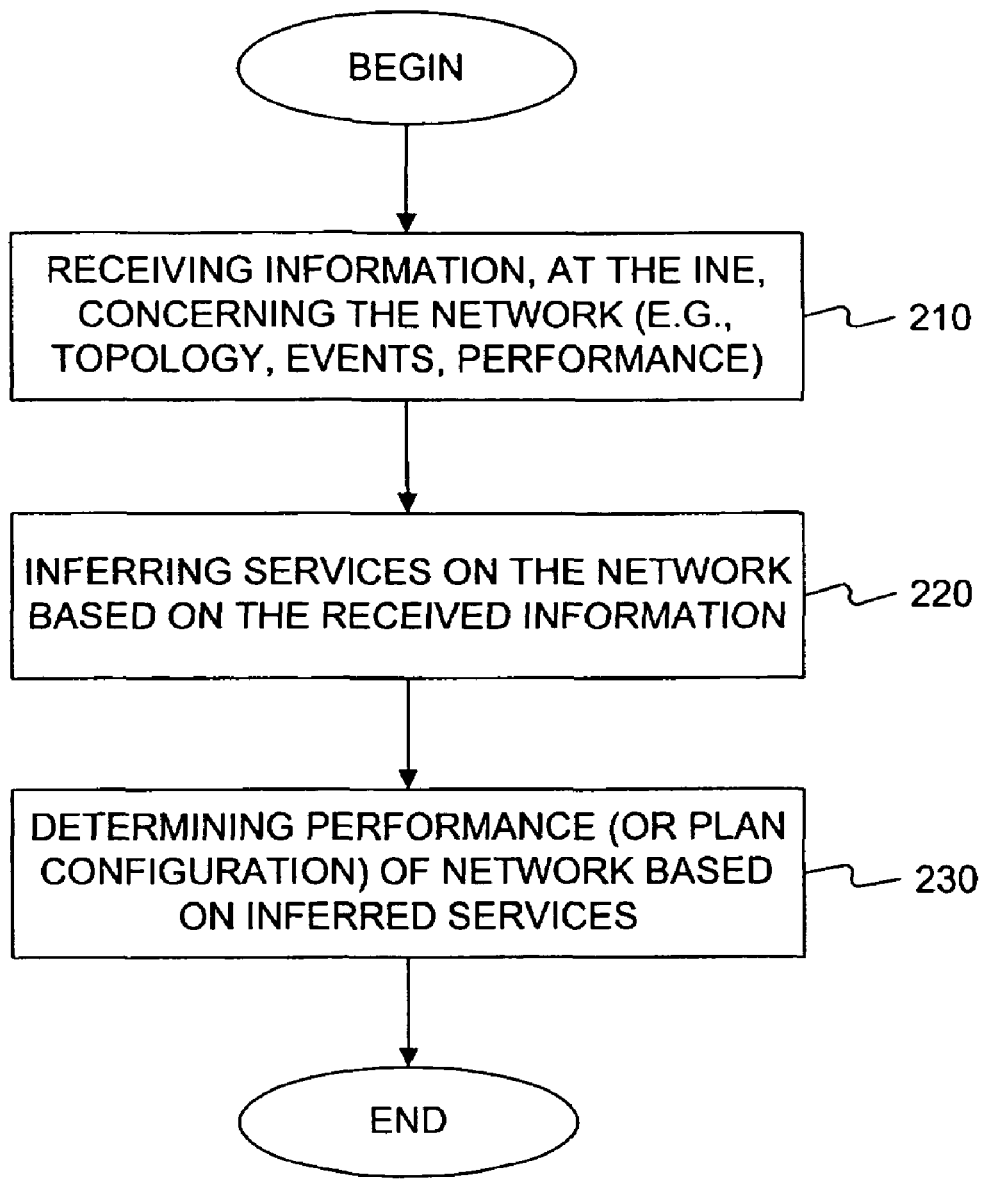
FIG. 2 is a flowchart showing exemplary steps for inferring services.

FIG. 2 is a flowchart with exemplary steps for inferring services consistent with one embodiment of the present invention. Referring to FIGS. 1 and 2, INE 170 may receive information regarding one or more nodes A-C 150-152 by posing as a router that gathers such information from nodes A-C 150-152 (step 210). The received information may be topologically relevant network information that includes one or more of the following: information concerning each of the nodes; interfaces at each of the nodes; connections (or routes) to other nodes, such as peer nodes or neighbor nodes; protocols associated with each of the nodes; event information, such as failures; and performance information, such as congestion and available bandwidth, for each of the nodes (or their associated interface(s) and/or connection(s)). As a member of network 1000, INE 170 receives information concerning each of nodes A-C 150-152.

Moreover, INE 170 may resolve conflicts in the received information. For example, INE 170 may use a routing protocol, such as Open Shortest Path First (OSPF), to receive routing information that includes information describing the interfaces at nodes A-C 150-152. INE 170 may also determine the interfaces at each of nodes A-C 150-152 by using an active protocol, such as a Simple Network Management Protocol (SNMP) or a Command Line Interface (CLI) protocol. A CLI refers to an interface, which may be standardized or proprietary to the communication device. In one example, INE 170 may have conflicting information concerning the interfaces at node A 150, e.g., the interfaces determined by the OSPF routing protocol may differ from the interface(s) determined by SNMP. When there is a conflict, INE 170 may resolve the conflict based on one or more rules. For example, INE 170 may use a rule that disregards any SNMP determined information when it conflicts with information discovered by a routing protocol, such as BGP.

INE 170 may provide any received information (as originally received and/or modified) to NMS 175. NMS 175 may store the received information and infer any services on the network based on the received information (step 220). For example, based on the information received from INE 170, NMS 175 may store that information in a database. NMS 175 may then infer that there is a VPN service between node A 150 and node B 151 based on the stored information. In one embodiment, NMS 175 may use one or more rules (and/or protocols) to infer that a service exists on network 1000. For example, a rule may be defined in NMS 175 to detect a specific protocol associated with a VPN, such as a BGP/MPLS route target. When a route target is detected in the received information of nodes A 150 and B 151, the rule may further provide that NMS 175 infer that there is a VPN service between nodes A 150 and B 151. As used herein the term "service" means capabilities or functions provided by network 1000 to a user (or user's data processor). In some embodiments, services are available on a network, e.g., a VPN between nodes A 150 and B 151. In other embodiments, a user may define a service. For example, a user may define a service as Company A's engineering VPN between nodes A-C 150-153. Moreover, the user may define a required Quality of Service (QoS) for the VPN service. Because services on a network typically involve multiple nodes, any single node may not be aware of a service available to users of a network. As such, NMS 175 may be used to infer the services on a network using information received from an INE.

In some embodiments, when additional networks or subnetworks are implemented, additional INEs can be deployed to receive information from their respective networks. When that is the case, the additional INEs would receive information from their respective nodes and then forward the information to NMS 175, where services may be inferred for the overall network. Moreover, the INEs may be organized into a hierarchy of INEs, with lower level INEs forwarding information to higher level INEs, which then aggregate that information before forwarding the information to another higher level INE. The process continues until all of the information is received by a root INE, which may be co-located (or included) with NMS 175. The root INE then aggregates all the received information—enabling the inference of one or more services. In some networks consisting of a plurality of (semi)-autonomous zones, such as subnetworks or OSPF routing domains, INEs may be distributed in each of the zones in a hierarchal manner to efficiently gather information concerning the entire network.

Once NMS 175 infers whether there are any services on a network, NMS 175 may determine a network performance (or plan a configuration) for the inferred service (step 230). For example, NMS may infer the existence of a VPN between nodes A 150 and B 151. Moreover, NMS 175 may associate the inferred service with the underlying network information (or objects). When that is the case, NMS 175 may determine the performance of the inferred VPN service by, for example, determining the performance of the underlying communication links (e.g., packet loss, bit error rate, severely errored seconds, and the like) corresponding to the VPN and/or determining the performance of any corresponding interfaces (e.g., congestion). As a result, when a user of NMS 175 manages network 1000 from a service perspective—retrieving underlying network topology, event, and performance information corresponding to the service being managed—the user may gain a more accurate picture of the quality of the VPN service as compared to approaches that merely use the performance of a single edge router of network 1000.

FIG. 2 will now be described in greater detail. To receive information (step 210), INE 170 may pose as a router and participate in network 1000 with the other nodes A-C 150-152. Rather than forwarding packets to a destination computer, as would be the case with nodes A-C 150-152, INE 170 receives information using one or more routing protocols, and then forwards any received information (as received or modified) to NMS 175. For example, INE 175 may include one or more of the following Internet protocols: BGP (Border Gateway Protocol version 4), SNMP (Simple Network Management Protocol versions 1-3), RIP (Route Instruction Protocol version 2), IS-IS (Intermediate System to Intermediate System), OSPF (Open Shortest Path First versions 2 and 3), Junoscript, NetFLow, and Cflow. By using one or more of these routing protocols, INE 170 can determine a significant amount of information, such as topology, event, and performance information (described in greater detail below), concerning each of nodes A-C 150-153 of network 1000. Moreover, INE 170 may structure the topology, event, and performance to form network object information, and send the network object information to NMS 175.

Although INE 170 may be able to determine network object information directly from the information routinely exchanged between nodes A-C 150-152, INE 170 can also infer network object information for a node by using a protocol to infer some additional network object information. For example, based on the aggregate information directly received from nodes A-C 150-152, INE 170 may use the OSPF protocol to determine a route between some of the nodes. Moreover, in some embodiments, INE 170 may infer the existence of any IPSec tunnels associated with a node. See RFC-2401, R. Atkinson, The Internet Society (1998), "Security Architecture for IP," that describes, inter alia, IPSec and is incorporated herein by reference in its entirety. For example, INE 170 may receive information that is indicative of nodes A 150 and B 151 having a protocol associated with IPSec tunnels. Specifically, when the received network information indicates that nodes A 150 and B 151 have exchanged cryptographic keys, such as an Internet Key Exchange (IKE), INE 170 may include a rule that enables the inference of an IPSec tunnel between nodes 150 and 151. See RFC-2409, D. Harkins et al., The Internet Society (1998), "Internet Key Exchange," which is incorporated herein by reference in its entirety. Alternatively, INE 170 may use SNMP to query a node, such as a router. The queried node provides information enabling INE 170 to infer the existence of the IPSec tunnel(s).

To infer services (step 220), NMS 175 first receives and then stores the information sent by INE 170. In some embodiments, NMS 175 includes a root INE (not shown) that receives information from lower level INEs, such as INE 170. NMS 175 may store the received information in a manner that is structured as network objects and arranged to model network 1000, as described in greater detail below with respect to FIG. 9. The network objects describe performance, events, and topology information for each of the nodes. Moreover, the network objects function to provide the state of each node at any given time. As such, when the received information for each of nodes A-C 150-152 is stored as network objects, the stored network objects serve as a model of network 1000 at any given time.

In one embodiment, to infer the existence of a VPN, NMS 175 may determine from stored network object information, such as VPN Routing and Forwarding (VRF) tables (or portions of such tables) exchanged between nodes as part of BGP update messages, whether VPN(s) exist on network 1000. For example, NMS 175 may determine from VRF information that there is a route target named "VPN A" which is exported by node A 150. Similarly, node C 152 may also import a route target named "VPN A." NMS 175 may then be able to infer based on the information it receives from INE 170 that nodes A 151 and C 152 have a VPN between them named "VPN A." As noted above, RFC-2547 "BGP/MPLS VPNs," describes route targets and BGP/MPLS VPNs.

When determining network performance or other network management parameters based on an inferred service(s) (step 230), NMS 175 makes a determination from a service perspective. For example, NMS 175 may determine performance by first identifying an inferred VPN service between nodes A 150 and C 152. Where the VPN was inferred based on underlying network objects received by NMS 175, NMS 175 can determine all of the relevant nodes, topology and performance information specifically associated with the inferred VPN service by retrieving the stored network objects corresponding to the VPN service. As such, NMS 175 can better determine performance of the VPN service when compared to a so-called "bottom-up approach" that merely uses information of a premises edge router node (e.g., packet loss at the edge router) without regard to other nodes and interfaces.

Figure 3:
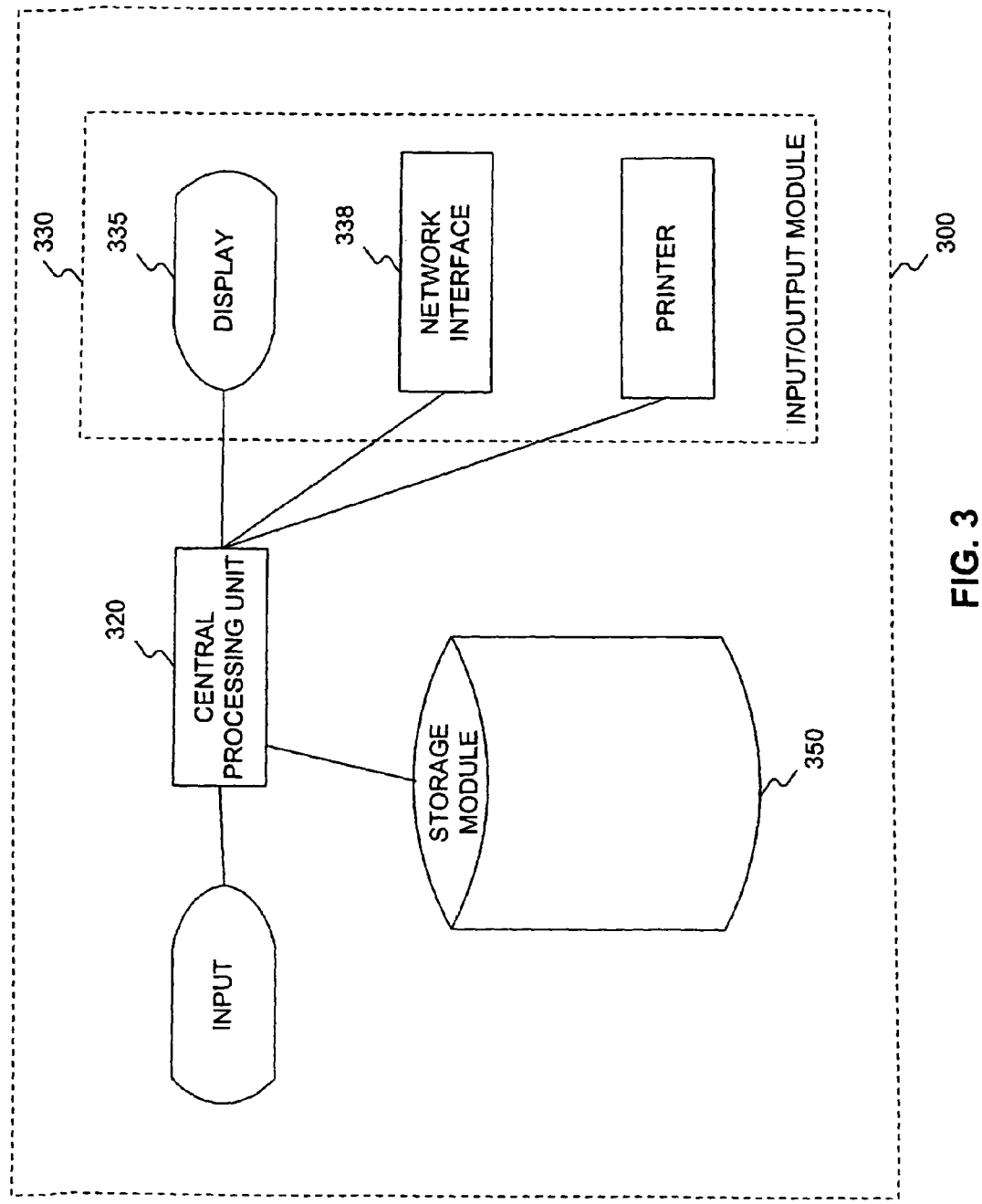
FIG. 3 illustrates another exemplary system environment.

Each of nodes A-C 150-152, INE 170, and NMS 175 may be implemented as a data processor, such as data processor 300 depicted in block diagram form at FIG. 3. Data processor 300 may include a central processing unit 320, a storage module 350, and/or an input/output module 330. In the case of nodes A-C 150-152, data processor 300 may include code, which configures CPU 320 to function as a router or a switch.

The I/O module 330 may include one or more input/output devices including a display 335, a keyboard, a mouse, an input storage device, and a network interface 338. Network interface 338 permits data processor 300 to communicate through a network, such as communication channel 120. For example, network interface 338 may be embodied as an Ethernet network interface card or a wireless LAN interface card, such as a card compatible with the IEEE 802.11 series of wireless LAN standards. In some embodiments, display 335 is separate from data processor 300. For example, display 335 may be another data processor connected remotely to data processor 300.

Central processing unit 320 may include, for example, one or more of the following: a central processing unit, a co-processor, memory, registers, and other processing devices and systems as appropriate. Moreover, unit 320 (or associated memory) may include source code (not shown) that configures data processor to function as a router to route packets, such as Internet Protocol (IP) packets.

Storage module 350 may be embodied with a variety of components or subsystems capable of providing storage including, for example, a hard drive, an optical drive, a general-purpose storage device, a removable storage device, and/or memory. Moreover, storage module 350 may include one or more of the following: network object information for each of the nodes of network 1000, inferred network objects, inferred services, and any other information associated with network 1000.

Although processor 320 is generally described in terms of data processor 300, processor 320 may also be incorporated into any other data processing or communication device including, for example, a router, a switch, a gateway, a bridge, and/or a network management system. For example, in one embodiment, each of nodes A-C 150-152 are embodied as routers; INE 170 is embodied as a data processor incorporated into a high performance core router; and NMS 175 is embodied as a data processor, such as a high performance work station (e.g., a SUN Fire E25K Server or a SUN V12 80).

Figure 4:
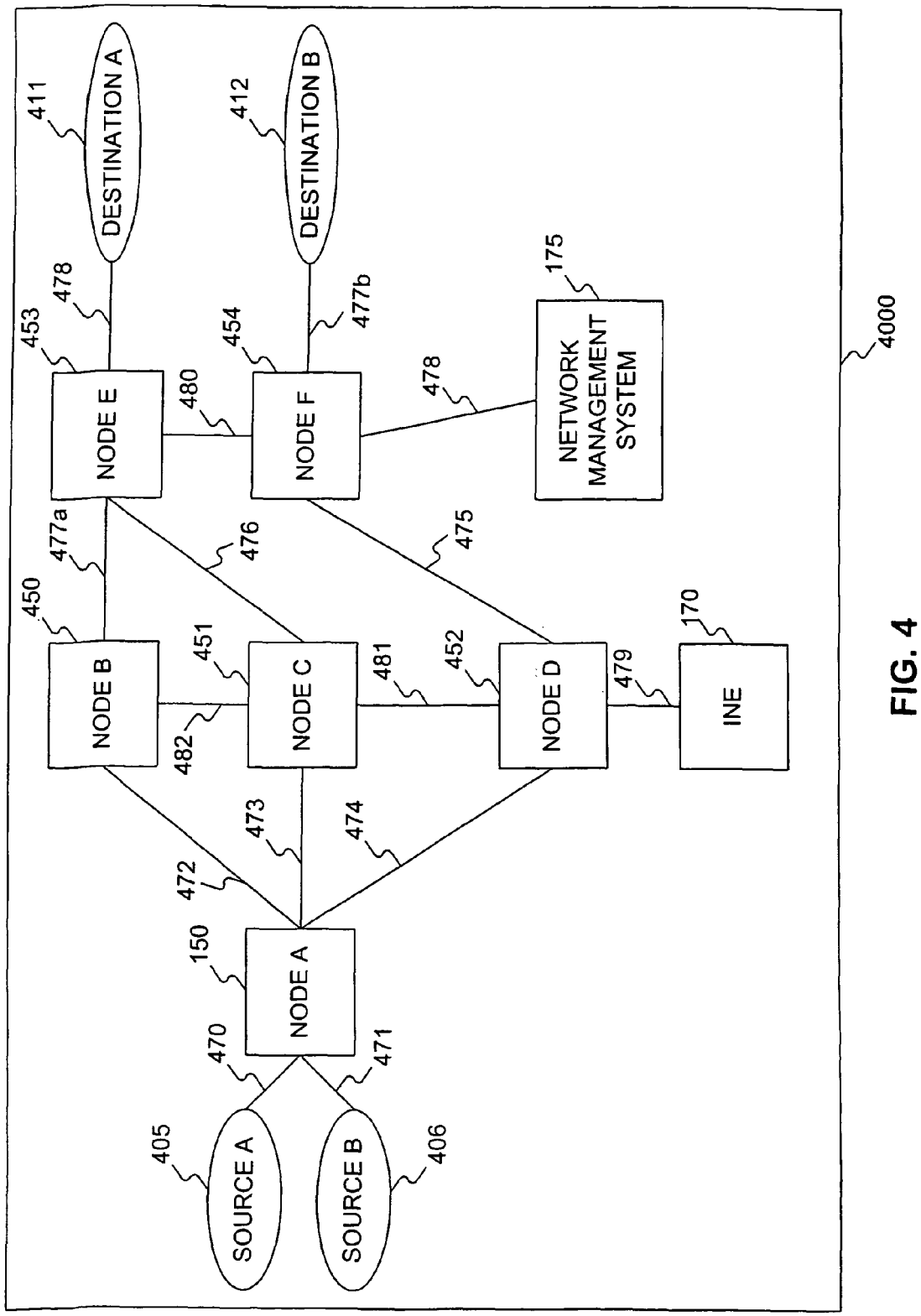
FIG. 4 illustrates another exemplary network environment.

FIG. 4 depicts another exemplary network environment 4000. Network environment 4000 includes sources A 405 and B 406, nodes A-F 150, 450-454, destinations A 411 and B 412, INE 170, NMS 175, and communication channels 470-482 (collectively referred to as the communication network).

Each of sources A 405 and B 406 may be embodied as a data processor, such as a computer, a router, a switch, a gateway, or any other type of communication or data processing device. For example, each of sources 405 and 406 may be embodied as a computer that functions to send IP packets through the communication network to a destination, such as destinations 411 and 412. Moreover, in environments where a plurality of INEs are used, NMS 175 may include an INE that serves as a root (or central) INE.

Nodes B-F 450-454 may be embodied in a manner similar to node A 150. Communication channels 470-482 may be embodied in a manner similar to communication channel 120.

Each of destinations A 411 and B 412 may be embodied as a data processor, such as a computer, a router, a switch, a gateway, or any other type of communication or data processing device. For example, each of destinations A 411 and B 412 may be embodied as a computer that functions to receive IP packets sent by sources A 405 and B 406 through the communication network.

Figure 5:
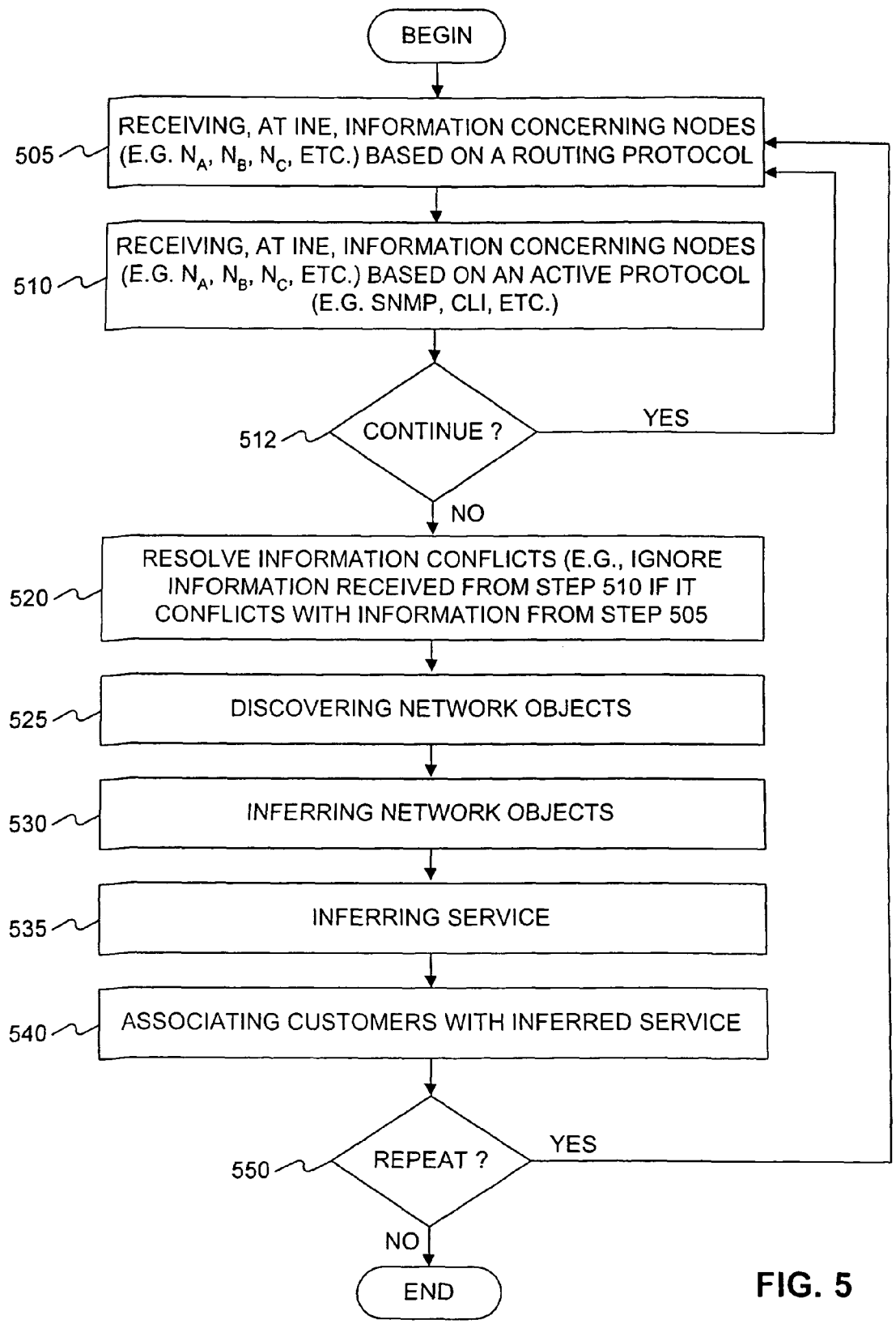
FIG. 5 is another flowchart showing exemplary steps for inferring services.

FIG. 5 is a flowchart with exemplary steps for inferring services and will be described with reference to the network of FIG. 4. INE 170 may receive information concerning each of nodes A-F 150, 450-454 based on a routing protocol (step 505), receive information concerning each of nodes A-F based on an active protocol (step 510), and continue to receive such information until the network reaches a quiescent state (step 512). If a quiescent state is not reached, INE 170 continues to receive such information (yes at step 512). Otherwise, INE 170 may resolve conflicting information received in steps 505 and 510 (step 520), discover network objects (step 525) based on the received information, and infer aggregate network objects (step 530). The information concerning each of nodes A-F, e.g., discovered network object information and inferred network objects, may then be sent to NMS 175. NMS 175 may then infer one or more services that may exist on network 4000 based on the network objects, which are structured to serve as a model of network 4000 (step 535). In some embodiments, NMS 175 may also use one or more rules or protocols to infer a service. Next, NMS 175 may associate customers and Quality of Service (QoS) parameters with the inferred services (step 540). Steps 505-540 may be repeated (step 550) to continue (as required) to receive network information and infer network objects and services.

To receive information concerning each of nodes A-F based on a routing protocol (step 505), INE 170 may pose as a router that is capable of exchanging (or receiving) routing information typically included in message exchanges between routers on an Internet Protocol (IP)-based network. Such message exchanges are typically based on one or more of the following routing protocols: BGP (Border Gateway Protocol), SNMP (Simple Network Management Protocol), RIP (Route Instruction Protocol), IS-IS (Intermediate System to Intermediate System), and OSPF (Open Shortest Path First). As such, INE 170 would include one or more of these protocols in order to gather information about each of nodes A-F. For example, with some of these routing protocols, a node gathers information about itself and its neighbors in order to determine how to route IP packets from a source to a destination though network 4000. By posing as a router that includes such routing protocols, INE 170 can gather information about nodes A-F 150, 450-454. Unlike nodes A-F which forward IP packets from a source (e.g., source A 405) to a destination (e.g., destination A 411), INE 170 does not forward any IP packets from a source computer to a destination computer on network 4000. For example, INE 170 may not advertise any routes to other routers (or nodes). As such, the other nodes will not attempt to route packets to INE 170.

In one embodiment, INE 175 receives information for each of nodes A-F by using its routing protocol to passively listen to detailed information regarding any interfaces at each of nodes A-F, such as Ethernet network interfaces or wireless network interfaces; any links associated with each of the interfaces; any peer nodes; any routes to each of the peers; any performance information for a node (or interface); any event information (e.g., failures or user-defined events); and any other information that may be exchanged as part of a routing protocol. For example, in the case of OSPF, each of nodes A-F exchanges information (e.g., via OSPF Hello messages) describing its links and adjacent neighbors on the links. Specifically in the case of OSPF, a Hello message is sent out by a node to discover neighboring nodes. A neighboring node compliant with OSPF responds with a Link State Update message that includes information describing the neighboring node and the link shared between the two nodes. See RFC-1131, J. Moy et al., The Internet Society (1991), "OSPF Version 2" that describes OSPF and its associated messages. In the case of BGP, each of nodes A-F exchanges (e.g., via BGP update messages) Internet route information and/or VPN route information with other nodes.

To receive information concerning each of nodes A-F based on an active protocol (step 510), INE 170 may use a SNMP (Simple Network Management Protocol) or, alternatively, a command line interface (CLI) command to query each of the nodes for any information. For example, if INE 170 cannot determine information for node E 453 (e.g., interfaces at the node), INE 170 may use SNMP to query that node. Since a SNMP query provides additional processing burden on a node when compared to passively receiving routing protocol information, in some embodiments, the use of active protocols, such as SNMP or CLI, is minimized and used when the passive routing protocol approach fails to provide sufficient information regarding a node.

INE 170 may continuously receive information for nodes A-F 150, 450-454. When network 4000 reaches a quiescent state, INE 170 may proceed to resolve conflicting information received in steps 505 and 510 (steps 512-520) both during the quiescent state and before the quiescent (discovery) state. INE 170 may determine that network 4000 is not in a quiescent state when INE 170 continues to discover additional nodes on network 4000. For example, when a predetermined period of time elapses (e.g., 2 minutes) without the discovery of a node, INE 170 may then determine that network 4000 is in a quiescent state. In some embodiments, attempting to proceed to steps 520-540 before network 4000 is quiescent can lead to erroneous results.

To resolve conflicting information received in steps 505 and 510, INE 170 may simply include a rule to resolve any conflicts (step 520). For example, INE 170 may disregard any SNMP information gathered in step 510 from a node, if the information conflicts with information received based on a routing protocol, such as RIP. Alternatively, any other rule(s) may be used, such as disregarding information gathered during step 505 when it conflicts with information from step 510.

INE 170 may directly discover network objects (step 530) based on the received information included in the routing protocol message exchanges between nodes A-F 150, 450-454. For example, INE 170 may identify a node, e.g., node A 150, its interfaces, its peers, any routes associated with that node, and any labels and/or corresponding paths associated with that node. For example, INE 170 may use OSPF to identify nodes, adjacent links connecting neighboring nodes and interfaces associated with any links. In the case of BGP, INE 170 may identify Internet routes advertised by a peer node, interfaces associated with the routes, and VPN information (e.g., exported route targets). Moreover, INE 170 may store the network object information in a structure so that all the information associated with node A is stored (or indexed) relative to node A, as described below in greater detail with respect to FIG. 9.

Figure 6:
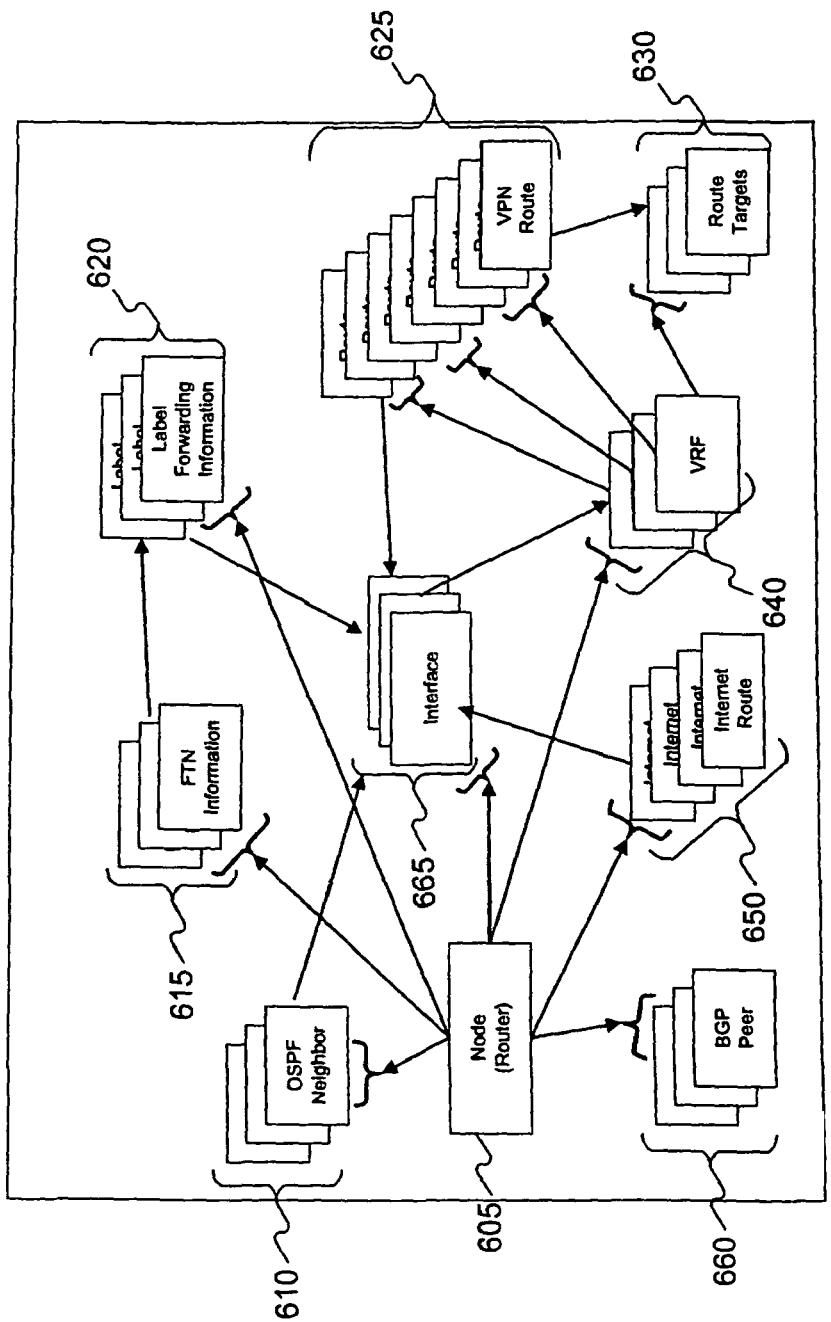
FIG. 6 depicts exemplary network objects.

FIG. 6 depicts exemplary network object information discovered directly from the information received in steps 505 and 510. Referring to FIG. 6, network object information for a node 605 may include one or more of the following: interfaces 665 at node 605; Border Gateway Protocol (BGP) peer(s) 660; Open Shortest Path First (OSPF) neighbors 610; FTN (Forward Equivalency Class-To-Next-Hop Label Forwarding Entry) information table 615 (see, e.g., RFC-3031, January 2001, "Multiprotocol Label Switching Architecture [MPLS]"); MPLS label forwarding information 620; VPN Routing and Forwarding (VRF) information 640; Virtual Private Network (VPN) route information 625 associated with VRF information 640; any route target(s) 630 associated with VRF information 640; and any Internet Route information 650.

Referring again to FIG. 5, INE 170 may use a protocol to infer additional network objects from the discovered network objects of step 525 (step 535). For example, as part of step 525, INE 170 may discover network object information that specifies a route from node A 150 to node D 452. INE 170 may also discover network object information that identifies a route from node D 452 to node F 454. Using the route information from step 525, INE 170 may infer that a routed path can be formed from source A 405 to destination B 412 through node A 150, node D 452, and node F 454. INE 170 can infer the routed path from node A 150 to node F 454 by determining a path using a protocol, such as OSPF, R1P, L2TP, BGP/MPLS, label switched path, or tunnels. By using a protocol to infer the routed path, INE 170 can infer network objects from the directly discovered network objects of step 525.

Figure 7:
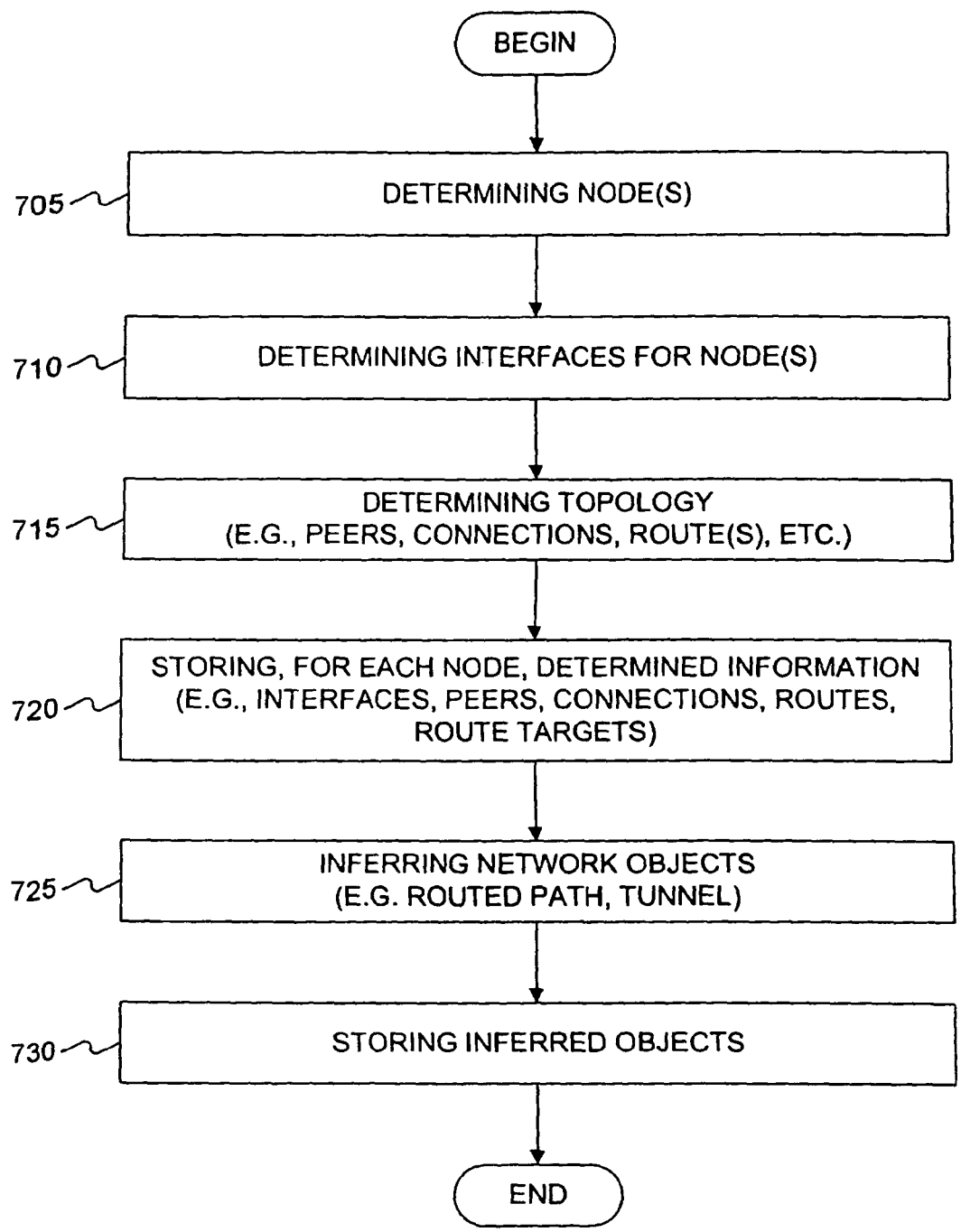
FIG. 7 is a flowchart showing exemplary steps for inferring network objects.

FIG. 7 is a flowchart with exemplary steps for inferring network objects. Referring to FIG. 7, INE 170 may determine any nodes that are associated with network 4000 (step 705); determine any interfaces associated with each of the nodes (step 710); and determine a topology, such as peer nodes, links (or connections) associated with the node interfaces, and any routes associated with the nodes (step 715). INE 170 may then store, as network objects, the determined nodes, interfaces, and topology information (step 720); and then based on the stored network object information, infer any network objects, such as a routed path and/or a tunnel (step 725); and then store the inferred objects associated with network 4000 (step 730). In an exemplary network that includes four nodes, N1, N2, N3, and N4, node N1 has a route to destination network D via node N3; node N3 has a route to destination network D via node N4; and node N4 has a route to destination network D via node N2. INE 170 can use OSPF (e.g., Dijkstra algorithm) to determine these routes (assuming that there is no local policy on the network or at a node overriding the receipt of the routing protocols). Alternatively using SNMP, the routing table information may be read from each of the four nodes to determine the routed paths. In both the OSPF and SNMP cases, when a user requests to identify the routed path from source node N1 to destination network D, INE 170 can provide the path as node N1 to node N3 to node N4 and to node N2.

Figure 8:
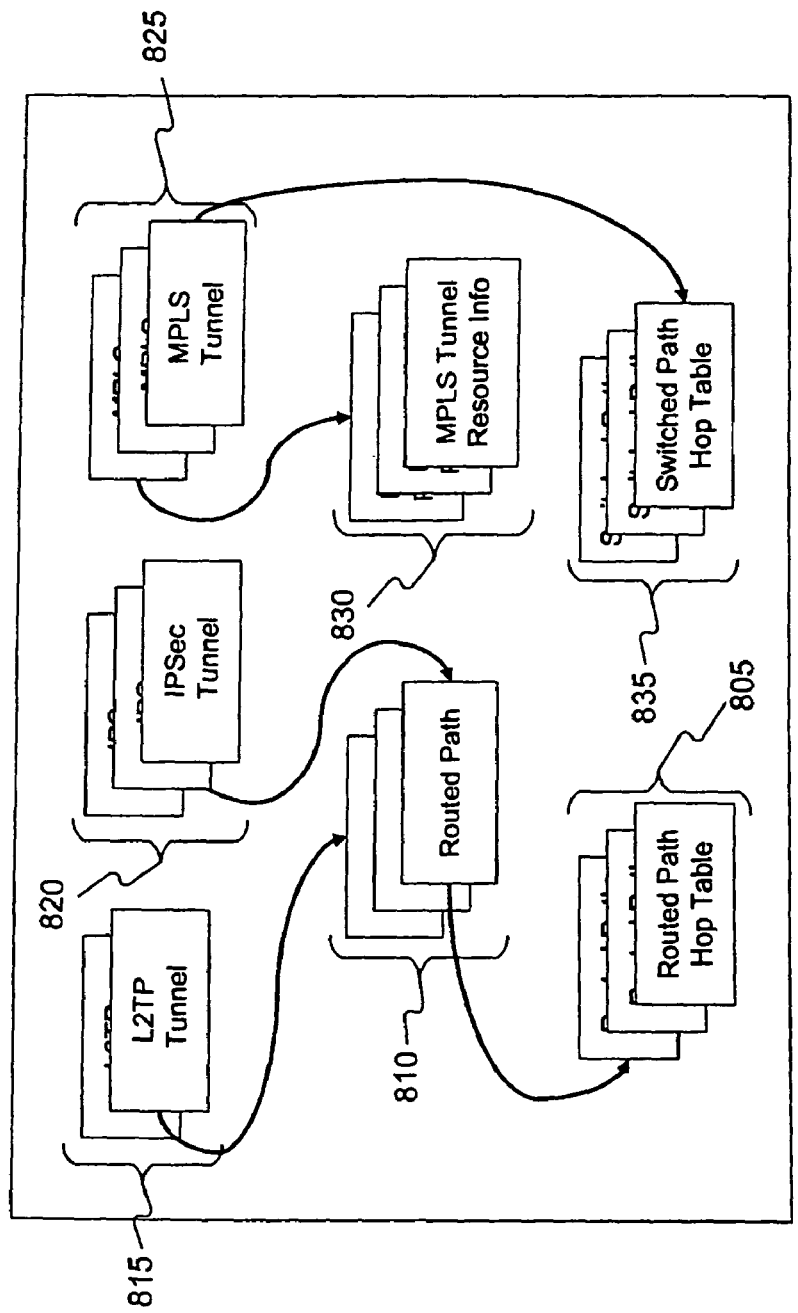
FIG. 8 depicts exemplary inferred network objects.

FIG. 8 depicts exemplary network objects that can be inferred by INE 170. Referring to FIG. 8, the inferred network objects may use routing protocols and the IPSec protocol to infer one or more of the following networks objects: a routed path hop table 805 (e.g., all the routed paths in network 4000 on a route by route basis); a routed path 810 (e.g., the overall routed path from source B 406 to destination B 412 through nodes A, D, and F 150, 452, and 454); and IPSec tunnel information 820 (e.g., tunnel between node A 150 and node D 452). FIG. 8 also shows that INE 170 may infer one or more additional network objects using other protocols, such as MPLS and the Layer 2 Tunneling Protocol (L2TP). For example, INE 170 may infer one or more of the following: an L2TP tunnel 815 through a routed path 810 based on the routed path hop table 805; a switched path hop table 835; MPLS tunnel resource information 830; and an MPLS tunnel 825.

One of ordinary skill in the art would recognize that L2TP uses PPP (Point to Point Protocol) based tunnels that serve as routed paths from a L2TP Access Concentrator (LAC) to a L2TP Network Server (LNS) through the network. See RFC 2661, W. Townsley et al., The Internet Society, (1999), "Layer Two Tunneling Protocol 'L2TP'", that describes L2TP, and is incorporated by reference in its entirety.

Figure 9:
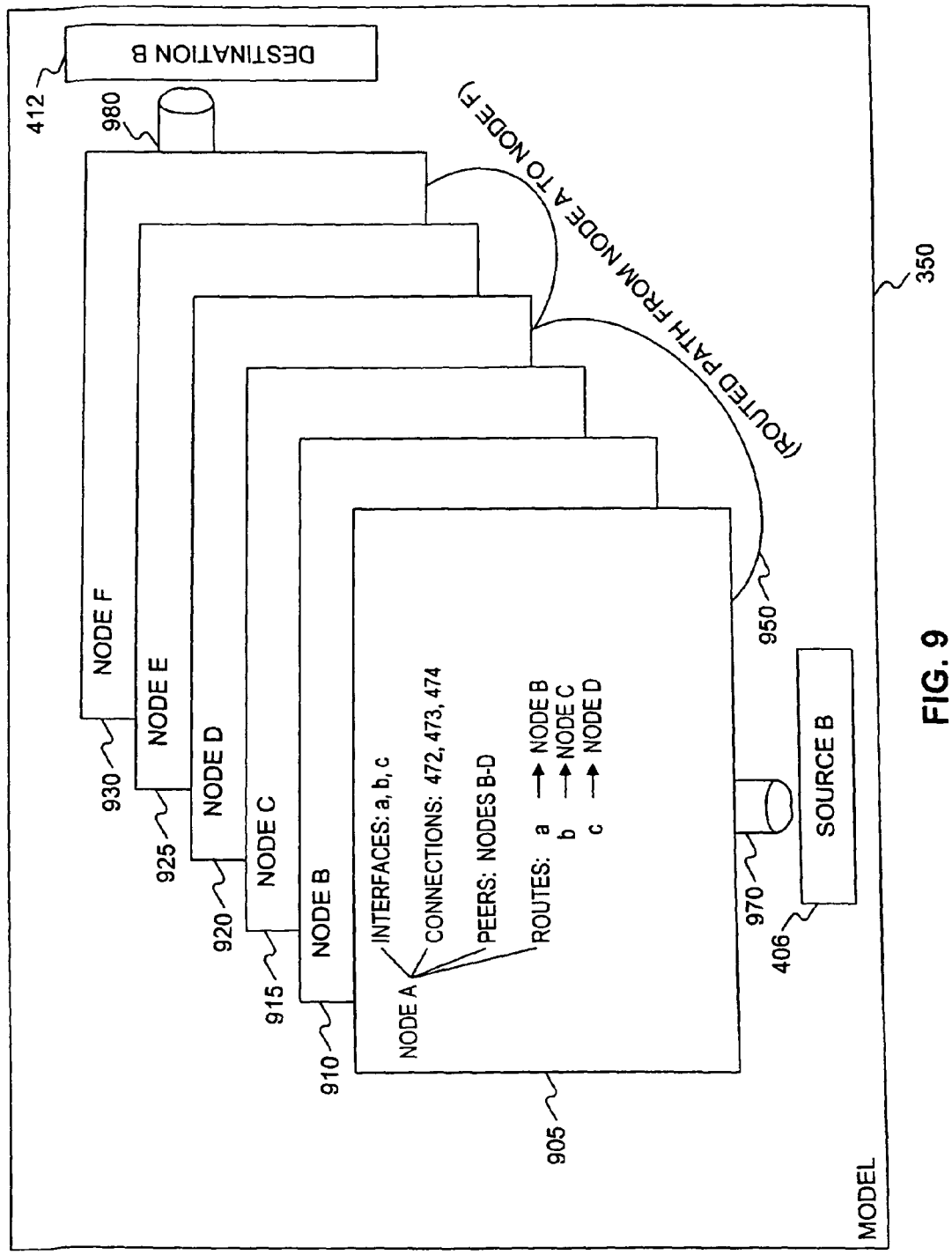
FIG. 9 depicts an exemplary database storing information concerning the network.
Figure 10:
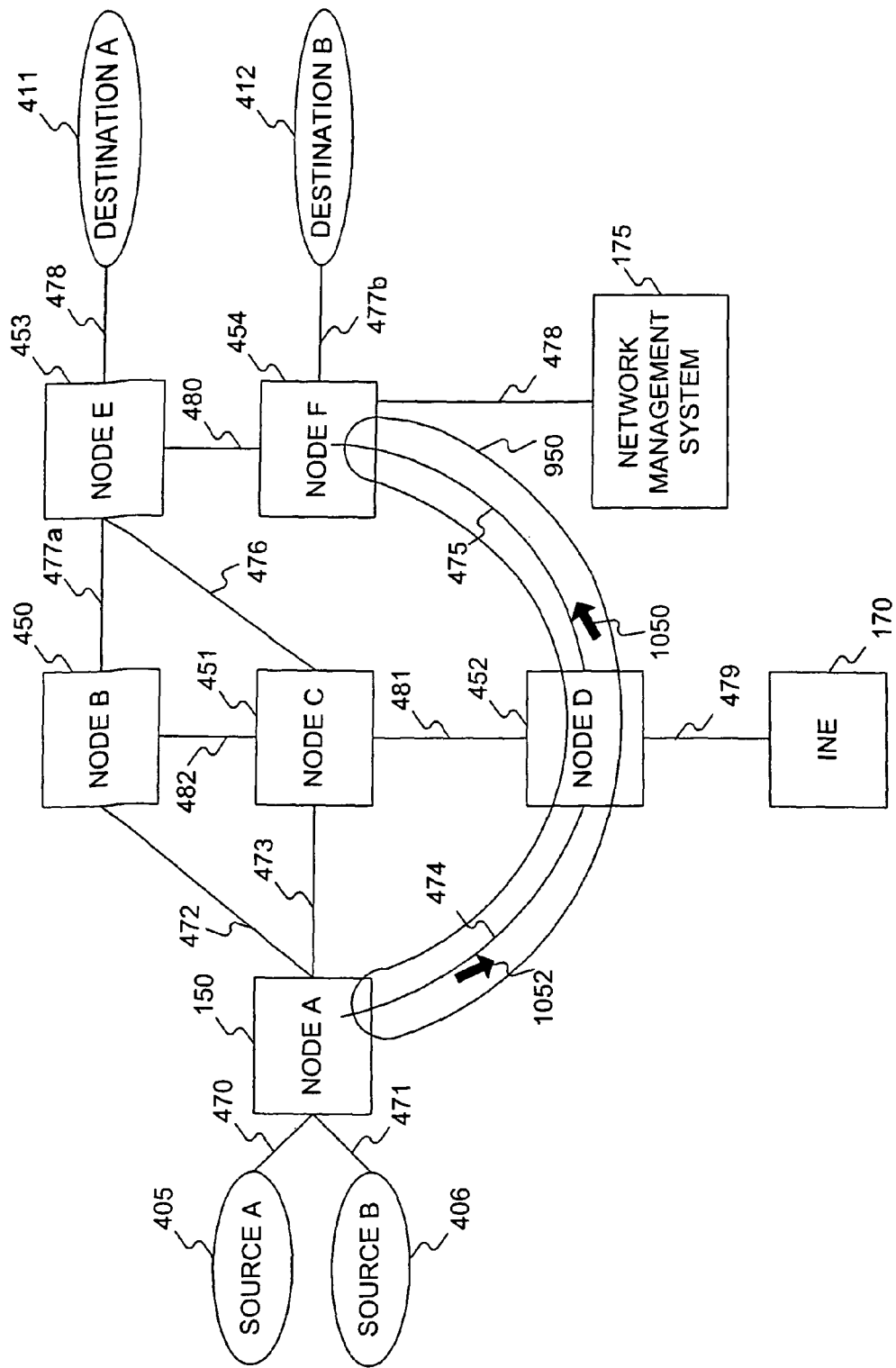
FIG. 10 depicts the exemplary network environment of FIG. 4 with a tunnel.

FIG. 9 depicts exemplary discovered and inferred network object information stored for network 4000. Referring to FIG. 9, for node A 150, INE 170 may store network object information 905 that includes one or more of the following: interfaces a, b, and c; respective communication links 472, 473, 474 for each of the interfaces; peer nodes B-D 450-452; and three routes (e.g., at interface a to node B 450, at interface b to node C 451, and at interface c to node D 452). Similarly, for nodes B-F 450-454, INE 170 may store network object information 910, 915, 920, 925, and 930 respectively. INE 170 may store inferred network object information, such as a routed path 950 from node A 150 to node F 454 through node D 452. In addition, INE 170 may infer IPSec tunnels 970 and 980 from source B 406 to destination B 412. The routed path 950 is depicted at FIG. 10. Referring to FIG. 10, there are two routes depicted. The first route 1052 represents a route from node A 150 to node D 452, while a second route 1050 represents a route from node D 452 to node F 454. The routes 1050 and 1052 are examples of discovered network objects since they can be directly determined from the routing protocols exchanges between the nodes of network 4000. However, INE 170 must some how infer the routed path 950 based on the stored information of FIG. 9 and one or more protocols since there is no single node that includes routed path information 950. Such aggregate information can only be determined using a rule or protocol, such as OSPF or IS-IS, to identify routed path 950.

Figure 11:
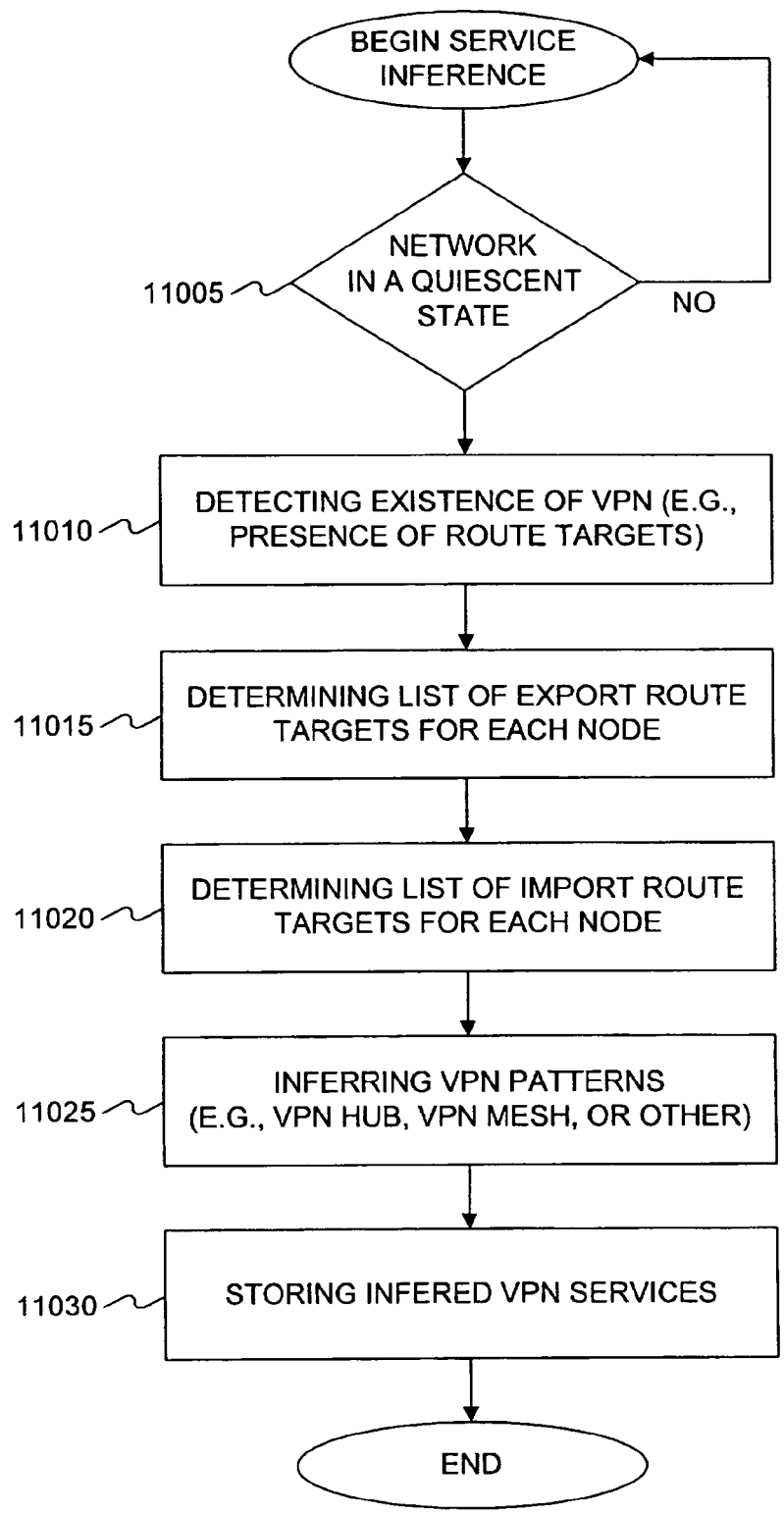
FIG. 11 is a flowchart showing exemplary steps for inferring a Virtual Private Network (VPN) service.

Referring again to FIG. 5, INE 170 may send to NMS 175 the discovered network objects of step 525 and the inferred network objects of step 530. Next, NMS 175 may infer one or more services based on the discovered and inferred network objects; a model, such as the model of the network depicted in FIG. 9; and/or one or more rules that can be used to infer the existence of the service (step 535). FIG. 11 depicts exemplary steps for inferring services on network 4000. Referring to FIG. 11, NMS 175 may begin the service inference when network 4000 is in a quiescent state (YES at step 11005). Otherwise, NMS 175 may wait until such a state occurs. When the network is in a quiescent state, NMS 175 detects the existence of a VPN (step 11010); determines a list of export route targets for each node (step 11015); determines a list of import route targets for each node (step 11020); infers VPN patterns, such as a VPN hub, VPN mesh, or any other pattern (step 11025); and then stores the inferred VPN services (step 11030).

As noted above, service inference should be performed when network 4000 is in a quiescent state, e.g., network 4000 being stable with no recent additions, deletions, or reconfigurations of nodes detected by INE 170 or NMS 175 (YES at step 11005). If the network is not quiescent (NO at step 11005), NMS 175 may simply wait a predetermined amount of time and repeat step 11005. For example, NMS 175 may determine that for a predetermined period of time (e.g., 2 minutes) additional nodes and corresponding network objects for that node have not been discovered. When that is the case, NMS 1705 may determine that the network is in a quiescent state. Initially, NMS 175 may not have any information regarding the objects and services associated with network 4000. As a model of the network develops (see e.g., FIG. 9), NMS 175 may approach a quiescent state. After an initial quiescent state is reached, any changes to the network are detected and the appropriate modifications to the model are made, so that NMS 175 understands the state of the network.

When network 4000 is in a quiescent state, NMS 175 detects the existence of a VPN (step 11010). To detect the existence of a VPN, in one embodiment, NMS 175 may determine the presence of BGP/MPLS route targets (also referred to herein as "route targets") being "advertised" by nodes. In particular, route targets are advertised at the behest of a specific VRF (Virtual Forwarding Routing) instance. A VRF instance is essentially information associated with a node, such as a customer router, and is representative of one or more VPNs at the node. The BGP/MPLS route target essentially serves to advertise that a node can send packets to (or reach) specific VPN(s) by exporting a route target for that specific VPN(s). On the other hand, a node may also import a route target for a specific VPN(s), indicating that the node will accept packets from that specific VPN(s). For example, a node that serves as a hub node may export a route target that identifies the hub node to other nodes of the VPN, and may import route targets of other "spoke" nodes participating in the same VPN since the hub node must accept packets from its spoke nodes. In the case of exported route targets, NMS 175 may simply detect the exported route target in the network object information described above. In the case of imported route targets, NMS 175 may need to actively query a node by performing an SNMP or CLI query to the node, requesting its imported route targets.

To determine a list of export route targets for each node (step 11015), NMS 175 directly determines from the BGP/MPLS messages exchanged between nodes (e.g., routers) the exported route targets for each node. For example, node A 150 may be a BGP/MPLS compliant PE-node, which exports route targets, e.g., a route target named "VPN-RED." The exported route target may be stored in a database with other information regarding that node, as depicted in FIG. 9. Moreover, as noted above, the route targets may be kept in conjunction with VRF tables associated with relevant nodes.

To determine a list of import route targets for each node (step 11020), NMS 175 actively uses SNMP or CLI to query each node for a list of the route targets that it imports. For example, node A 150 may import route targets from other nodes that participate in the VPN named "VPN-RED." These imported route targets are kept on a per VRF (or per node) basis.

Figure 12:
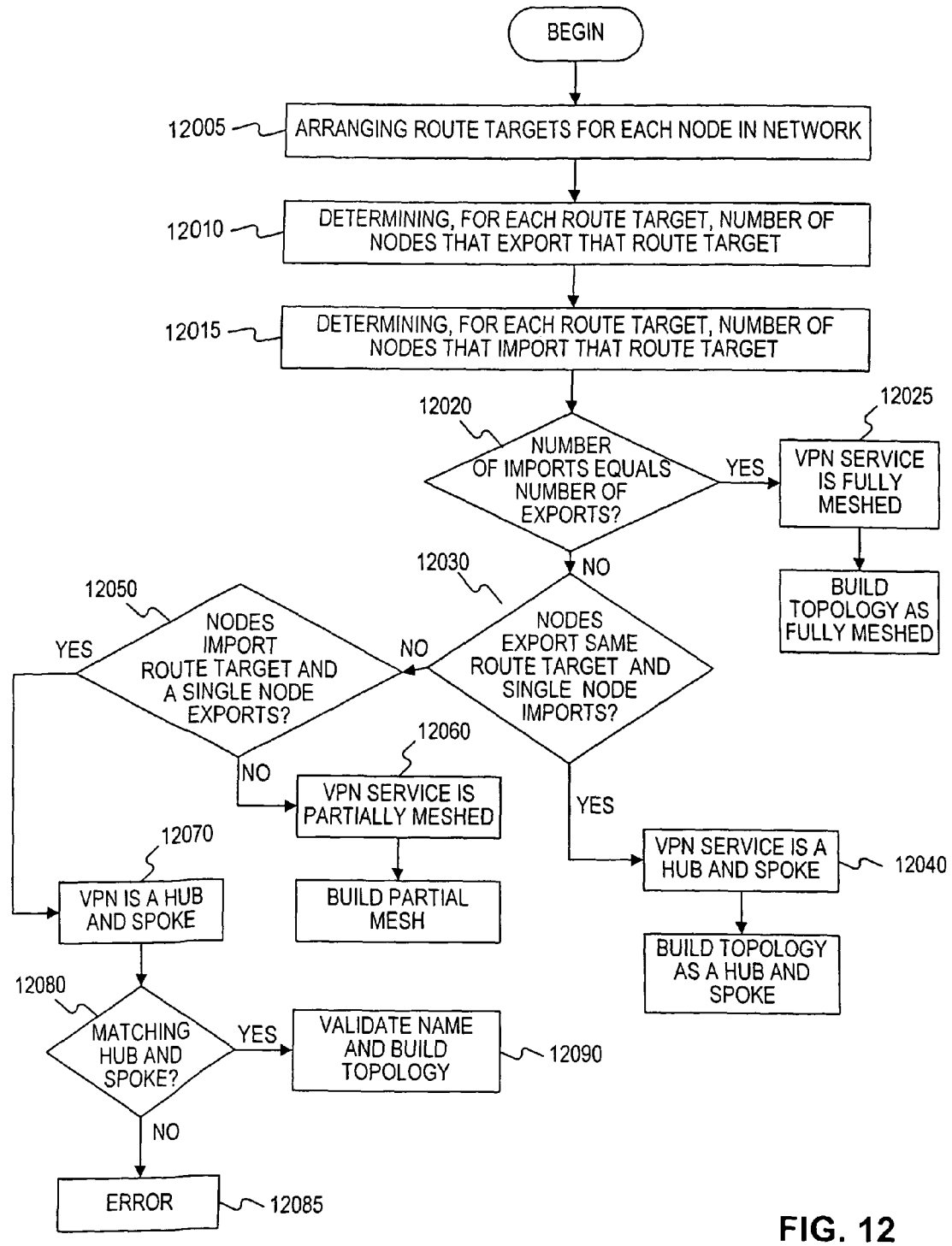
FIG. 12 is a flowchart showing exemplary steps for determining a topology of a VPN.
Figure 13:
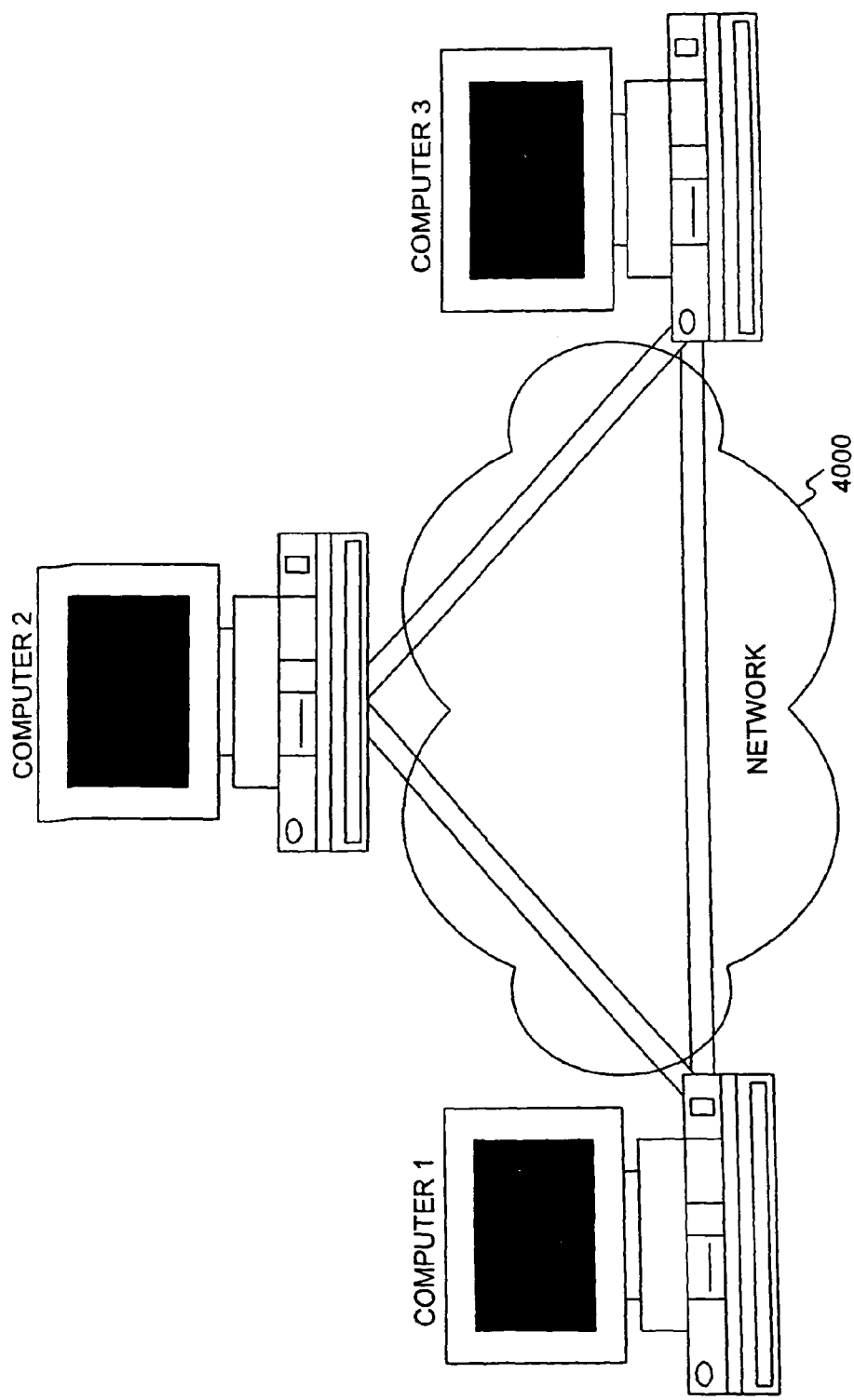
FIG. 13 depicts an exemplary mesh topology.

To infer VPN topology patterns, such as whether the VPN is a hub, a mesh, or any other pattern (step 11025), NMS 175 may use one or more rules. In one embodiment, NMS 175 may use the rules associated with FIG. 12 to infer VPN patterns. Referring to FIG. 12, NMS 175 may arrange all the route targets by node in a network (step 12005). For each route target, NMS 175 may determine the number of nodes that export that route target and the number of nodes that import that route target (steps 12010-12015). If the number of nodes importing a route target is the same as the number of nodes exporting that same route target, NMS 175 determines that the VPN topology associated with that route target has a mesh configuration (steps 12020-12025). FIG. 13 depicts an exemplary VPN mesh topology through network 4000 between three computers that function as sources and/or destinations.

Referring again to FIG. 12, if the number of nodes importing a route target is not the same as the number of nodes exporting that same route target (NO at 12020), NMS 175 may then determine whether the route targets correspond to another VPN topology, such as a hub and spoke or a partial mesh. To that end, NMS 175 determines whether multiple nodes export the route target and only a single node imports the route target (step 12030). If that is the case (YES at step 12030), the route target is likely to represent a spoke of a VPN hub and spoke topology configuration, with the route target being representative of a spoke node (step 12040).

Otherwise (NO at step 12030), NMS 175 determines whether multiple nodes import the route target and a single node exports the route target (step 12050). If that is the case (YES at step 12050), the route target is likely to represent a hub and spoke topology, with the route target being representative of the hub node (step 12070). Otherwise (NO at step 12050), the route target is likely to represent a partial mesh topology configuration (step 12060).

NMS 175 may also validate the determinations made in steps 12040 and 12070 by determining whether the hub and spoke nodes match. Specifically, NMS 175 should be able to compare the hub node determined in step 12070 to the corresponding spoke nodes determined in step 12040 since a hub must have corresponding spokes (step 12080). NMS 175 may also validate the VPN name included in the route targets by comparing the names associated with the route targets (step 12090). As such, NMS 175 can build a VPN topology configuration by associating the nodes of a VPN, the topology configuration associated with those nodes, and any corresponding name(s).

Figure 14:
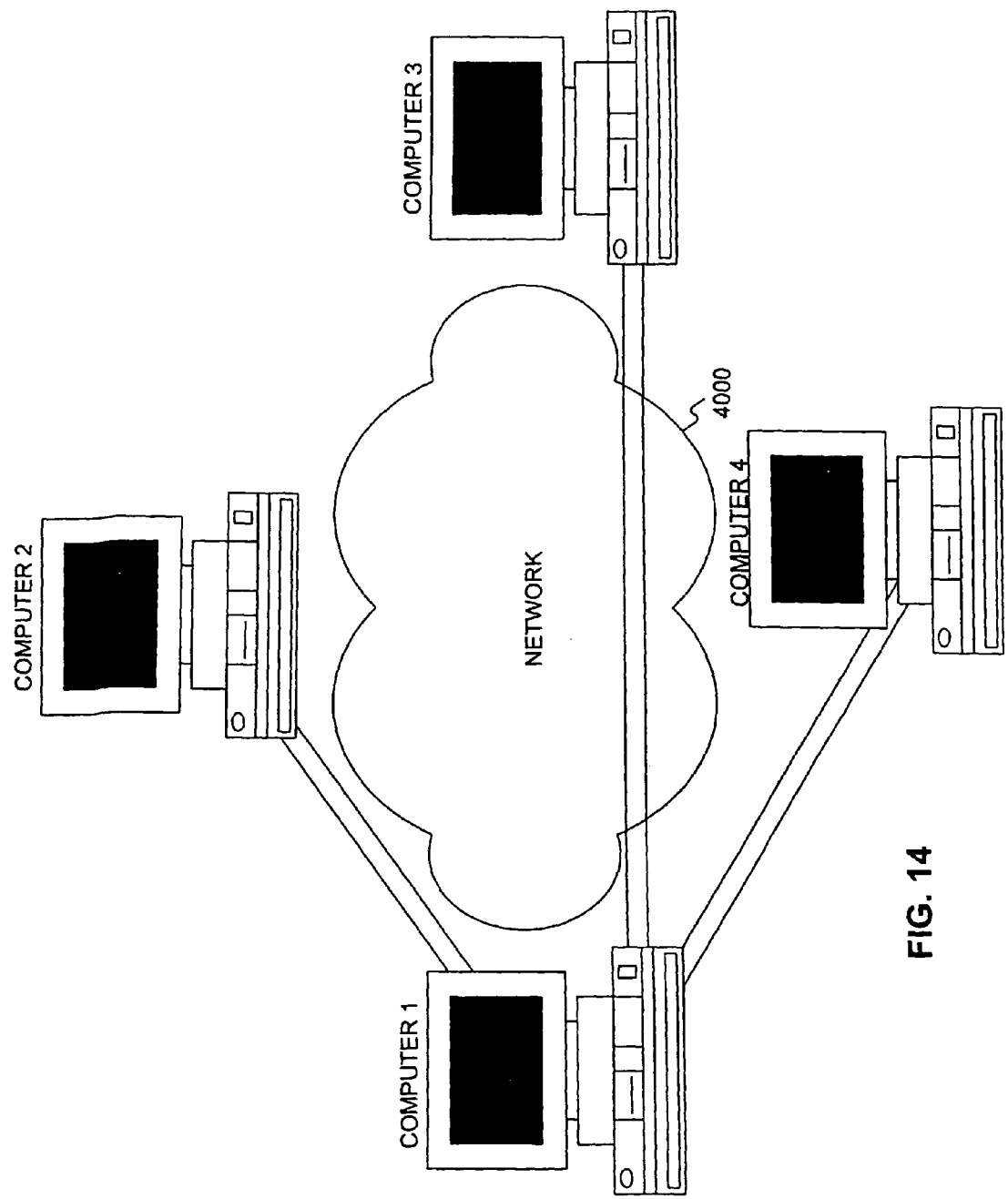
FIG. 14 depicts an exemplary hub and spoke topology.

FIG. 14 depicts an exemplary VPN hub and spoke configuration through network 4000 between four computers that function as sources and/or destinations.

Returning to step 12005, when the route targets are arranged, NMS 175 will be able to determine that node A exports route target "V1-Hub" and imports the route target(s) "V1-Spoke." Similarly, nodes B-D 450-452 export route target "V1-Spoke" and import the route target "V1-Hub." In this example, for route target "V1-Spoke", NMS 175 will be able to determine that multiple nodes export this target and a single node imports it—making the VPN topology a hub and spoke, with the route target corresponding to a spoke node (steps 12030-12040). As such, nodes B-D 450-452, which export route target "V1-Spoke," are likely to be spokes. Moreover, for route target "V1-Hub", NMS 175 will be able to determine that multiple nodes import this target and a single node exports it—making the topology a hub and spoke, with the route target corresponding to a hub (steps 12050-12070). As such, node A 150 is likely to be a hub since it exports route target "V1-Hub."

Since steps 12005-12070 are repeated for each node in network 4000, NMS 175 will be able to match the determined hub nodes and spoke nodes (steps 12080). For example, when processing any route targets for node A 150, NMS 175 determines that it is a hub node for VPN V1, with the other nodes being spoke nodes for VPN V1. Later, NMS 175 processes the route targets for nodes B-D 450-452. These results should match, i.e., nodes B-D 450-452 should indeed be spoke nodes for hub node 150. Otherwise, there is an error (step 12085). In some embodiments, steps 12005-12070 can be repeated. If the same error occurs, SNMP can be used to resolve the error. Lastly, NMS 175 may further validate that the topology configuration is correct by ensuring that the VPN name of VPN-V1 (if defined by the PE router nodes) is common for the hub node and the spoke nodes. In this case, the name "V1" is common among all of the route targets (e.g., "V1" appears in both "V1-Hub" and "V1-Spoke"), validating the VPN name "V1" (step 12090).

Returning to FIG. 11, at this point, NMS 175 has inferred a VPN service (step 11025). The inferred VPN service may then be stored in a database as an inferred VPN service (step 11030). In one embodiment, NMS 175 may store any inferred services in a structured manner such that the relationship between the inferred VPN "V1" and other network objects can be readily determined. For example, in FIG. 9, information representative of VPN "V1", is stored 406, 412 such that the relationship between VPN V1 and other network object information (e.g., tunnel 980, node F network object information 930, routed path 950, node D network object information 920, and node A network object information 905) can be readily determined. Furthermore, any other services that may be inferred by NMS 175 may also be stored in database 350. The stored information thus serves as a model representative of network 4000.

Although the above embodiment describes the inference of a BGP/MPLS VPN, other services may be inferred including, for example, a L2TP VPN. Moreover, the inferred service may be a virtual Private LAN (Local Area Network) service that emulates a LAN across an IP and an MPLS compliant IP network and that allows standard Ethernet devices to communicate with each other as if they were connected to a common LAN segment. Furthermore, the inferred service may be a virtual private wire service that provides layer-2 point-to-point connectivity (e.g., Frame Relay DLCI (datalink connection identifier), ATM VPI/VCI (Virtual Path Identifier/Virtual Channel Identifier), and point-to-point Ethernet) across an IP and an MPLS compliant IP network. In the case of a layer-2 VPN service, a layer-2 VPN service may be inferred by, for example, using BGP as an auto-discovery mechanism (see http://www.ieff.org/internet-drafts/draft-ietf-l3vpn-bgpvpn-auto-04.txt), using a Radius server for auto-discovery (see http://www.ietf.org/internet-drafts/draft-ietf-l2vpn-radius-pe-discovery-00.txt), or using LDP for auto-discovery (see "Discovering Nodes and Services in a VPLS Network", O. Stokes et al, draft-stokes-ppvpn-vpls-discover-00.txt, June 2002).

Although network 4000 depicts a single INE 170, a plurality of INEs may be used instead. When that is the case, NMS 175 receives network object information from each of the INEs and then infers one or more services of network 4000. Although the embodiment described herein refers to the NMS 175 inferring services, INE 170 may also infer services instead consistent with the systems and methods of the present invention.

Referring again to FIG. 5, with a service(s) inferred, NMS 175 may associate a customer with any of the services that are inferred (steps 535-540). For example, NMS 175 may infer two VPN services, namely, a VPN named "Blue" and another named "Green." The VPN named "Green" may be associated with Company A, while the VPN named "Blue" may be associated with Company B. Moreover, NMS 175 may allow a user to make such associations. Alternatively, the names may be determined from an external system, such as a provisioning server, policy server, and/or Radius server. The associations may further define one or more parameters for each of the customers, such as a required QoS. Lastly, NMS 175 may repeat steps 505-540 (step 550) to maintain an accurate model representative of network 4000 at any given time. In some embodiment, when steps 505-540 are repeated, INE 170 only provides network object information that has changed from the previous set of steps 505-540.

Figure 15:
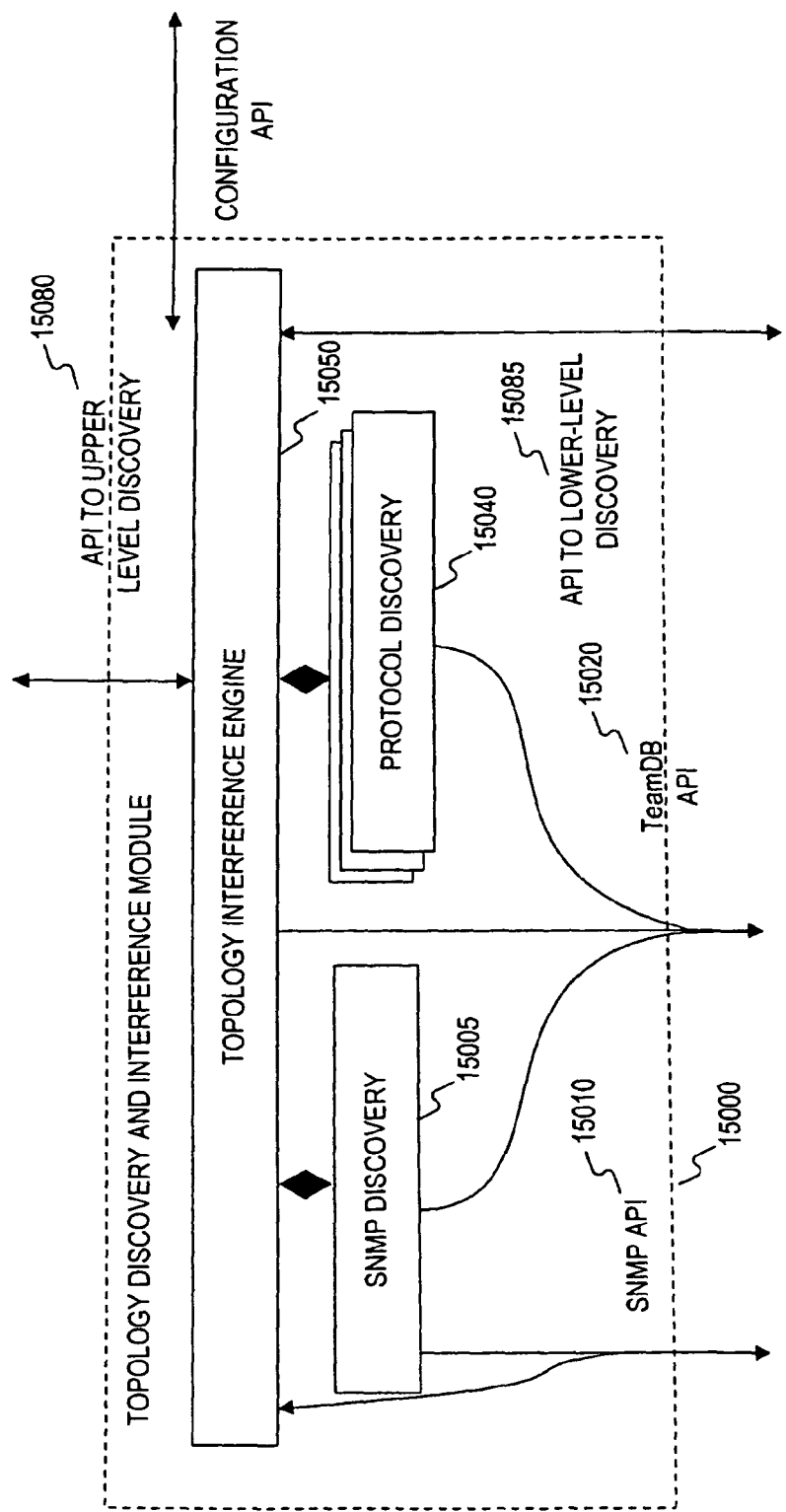
FIG. 15 depicts an exemplary module for inferring topologies of a network.

FIG. 15 depicts an exemplary Topology Discovery and Inference module (TDIM). TDIM 15000 may function to discover SNMP network object information by using an SNMP module 15005 and an SNMP application program interface module 15010. Modules 15005-10 perform SNMP queries of a node (e.g., a router), as described above with respect to step 510. Protocol discovery module 15040 may access information in database 350 through a database application program interface module 15020. Interface module 15020 provides access to stored network object information, such as information stored in database 350. TDIM 15000 may also include a topology inference module 15050 for receiving stored information that enables module 15050 to infer a topology, as described above with respect to FIGS. 11-12. TDIM 1500 may also include a lower-level discovery API 15085 and upper-level discovery API 15080 to interface to other modules of NMS 175 or INE 170. In some embodiments where a plurality of INEs are used, the lower-level API 15085 may access another INE, while the higher-level API is used to access another INE or the NMS.

Figure 16:
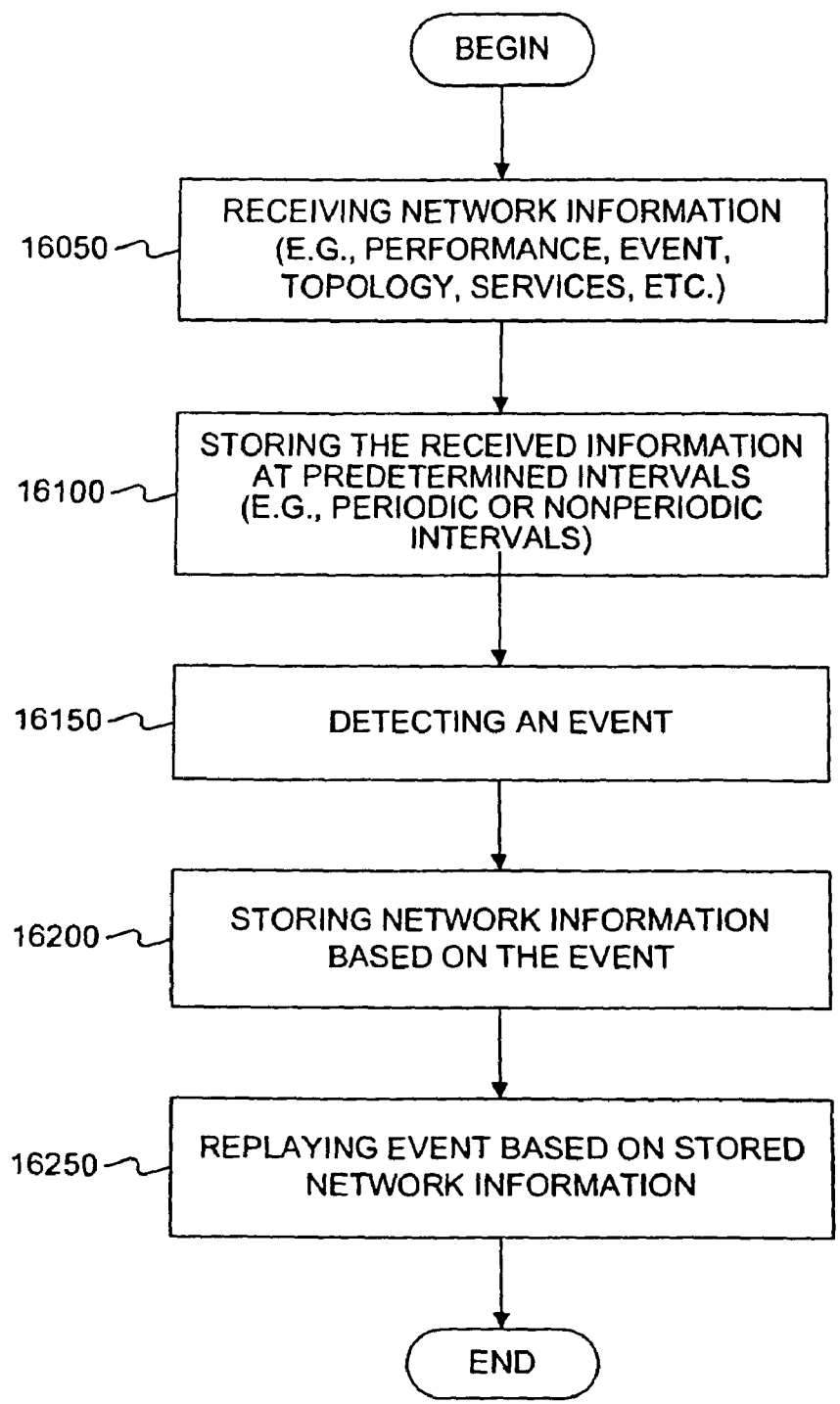
FIG. 16 is a flowchart showing exemplary steps for replaying a network event based on stored network information.

FIG. 16 depicts steps associated with replaying network events based on information stored in database 350. NMS 175 may receive network information (e.g., performance, event, topology, and any inferred service(s)), and periodically store the received information (steps 16050 and 16100). When a network event occurs, such as a failure at a node or a link or any other event that has the potential to change the topology, NMS 175 may detect (or be notified of) that event and store any network information associated with the topologically relevant detected event (steps 16150-16200). A user of NMS 175 may then be able to replay the event based on the information stored during steps 16100 and 16200. Moreover, the replay may depict how the network (including services and network objects) appears on the network. The replay function serves as an instant replay of the failure. Thus, a user of NMS 175 can investigate the network before, during, and after the event. Steps 16050-16250 are described below in greater detail.

NMS 175 may receive network information including one or more of the following information: discovered and inferred network objects, event, topology, and any inferred service(s), all of which have been described above (step 16050). NMS 175 may initially store the received information (steps 16100) in database 350. The initial stored information represents the "baseline" of network 4000 at any given time. In one embodiment, subsequent to the baseline, NMS 175 stores network information at predetermined intervals, e.g., once every 2 minutes or once per day. For example, all the network information may be stored once per every day. After a daily periodic store of network information, NMS 175 may only store the network information that has changed when compared to the initial baseline. For example, NMS may store information that is relevant to the topology of the network, such as the addition of a node interface, a failure of an interface, an added service, and any other information that can affect the topology of the network. In some embodiments, NMS 175 stores a list of events that are considered topologically relevant.

Figure 17:
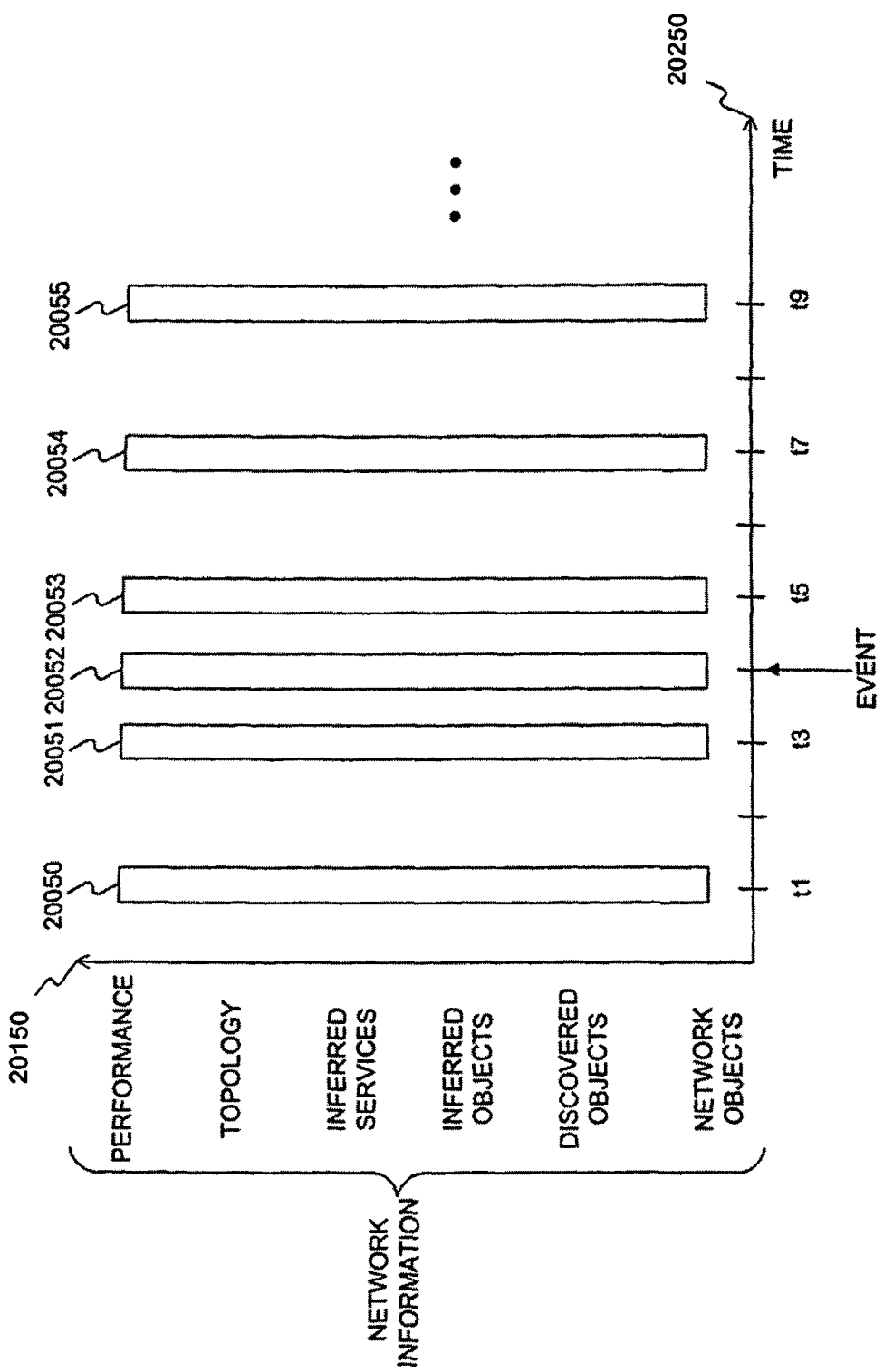
FIG. 17 is a plot showing network information stored as a function of time.

FIG. 17 depicts a plot of network information 20150 versus time 20250. Referring to FIG. 17, at time t1 20050, NMS may initially store network information that represents the "baseline" of network 4000. At time t3 20051, NMS 175 stores only the network information that has changed since time t1.

Referring again to FIG. 16, when a network event occurs, such as a failure at a node or link, NMS 175 may detect (or be notified of) that event. For example, NMS 175 may receive network information indicative of performance (e.g., a failure or a very high packet loss rate at a node or an interface). NMS 175 may then store the network information associated with the detected event 20052 (step 16200). NMS 175 may store all network information available or, alternatively, only network information that has changed because of the event. Moreover, NMS 175 may store network information slightly before (e.g., ½ second), during, and slightly after the event. After network information associated with the event 20052 is stored (step 16200), NMS 175 may continue to store network information as depicted at t5 20053, t7 20054, and t9 20055.

As used herein, the term periodically means from time to time, i.e., at constant predetermined intervals or at a reoccurring, non-constant intervals. By storing network information periodically or when prompted by an event, NMS 175 is able to efficiently store network information for later replay and analysis.

When a user of NMS 175 replays the network event, NMS 175 may retrieve any stored network information. In some embodiments, the network information is stored in a structured manner, such as the model depicted in FIG. 9. When that is the case, NMS 175 may be able to reproduce the state of network 4000 based on the stored model at various times. For example, NMS 175 may be able to reproduce the topology of network 4000 at times t1, t3, the event, t5, t7, and t9. If the failure event is a node failure, the replay of the topology may depict the loss of a node of network 4000. Moreover, inferred services and performance information may be depicted with the topology during the replay. For example, the IP packets lost per unit interval of time at the failed node (or interface) may be depicted as part of the replay. Furthermore, the inferred service may also be displayed to indicate which customers were affected by the node failure.

NMS 175 may also provide a fast-forward or slow motion feature, enabling a user to control the speed at which network information is displayed during the replay. NMS 175 may also provide a reverse feature to enable a user to step through the replay backwards, e.g., time t9 to t1. NMS 175 may also include a pause function to stop the replay at any time. As such, the replay function serves as a replay of a network event, facilitating a user of NMS 175 to analyze the network before, during, and after the event. In some embodiments, a user may view displays of a performance time-chart (such as packet loss over time), an event history table, and a topology (network) map, all three of which may be synchronized to have a common time base. When the displays are synchronized, as a user moves his cursor (or uses the forward button) to step forward in time through a replay, the event table highlights other events in time and the topology map changes to reflect the status at each new time. Moreover, the scope and level of detail of the topology display may be chosen by the user.

Figure 18:
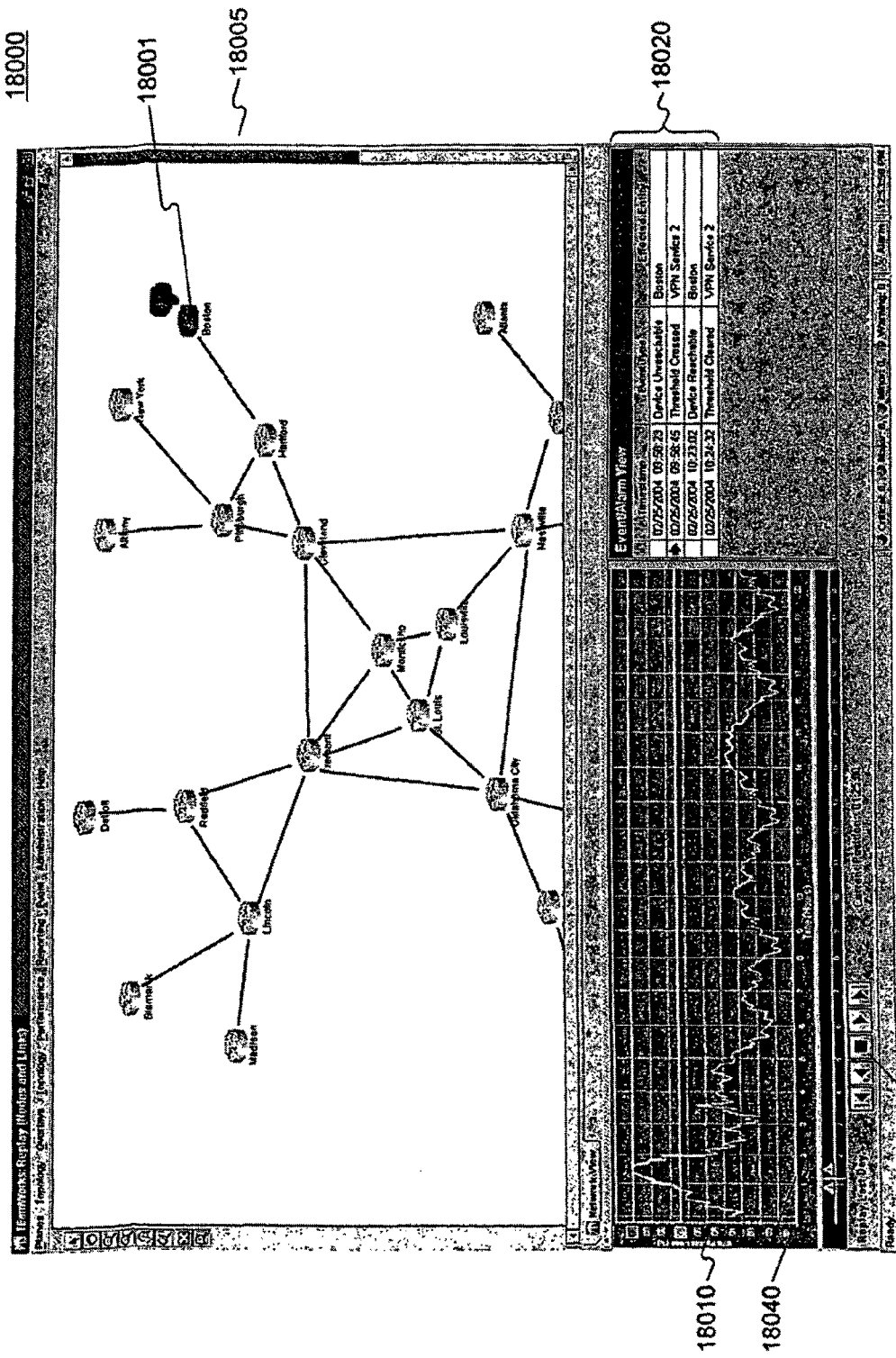
FIG. 18 depicts an exemplary replay display.

FIG. 18 depicts an exemplary display 18000 including a topology display 18005, a graph of VPN packet loss versus time 18010, an event/alarm display 18020, replay controls 18030, and a current position indicator 18040. Replay controls include one or more controls, such as a rewind, backward play, stop, forward play, and fast forward (although other control functions may also be used). FIG. 18 shows that current position indicator 18040 is at time 1:25 18045. As such, topology display 18005 depicts the state of the network at that time. A user may use replay controller 18030 to move forward or backward in time. Referring to topology display 18005, a node named Boston 18001 appears to have an event/alarm, as indicated by the darkened color of the node and lines 1 and 2 of event/alarm display 18020. A user may move backward in time by using replay controller 18030. Moreover, a user may drill down at any node, such as Boston 18001, by clicking on Boston 18001 to view the node in greater detail. For example, a user may double click on Boston 18001 and perform a replay of the latency at that node (or on of its interfaces) before, during, and after the event(s) associated with Boston.

Figure 19:
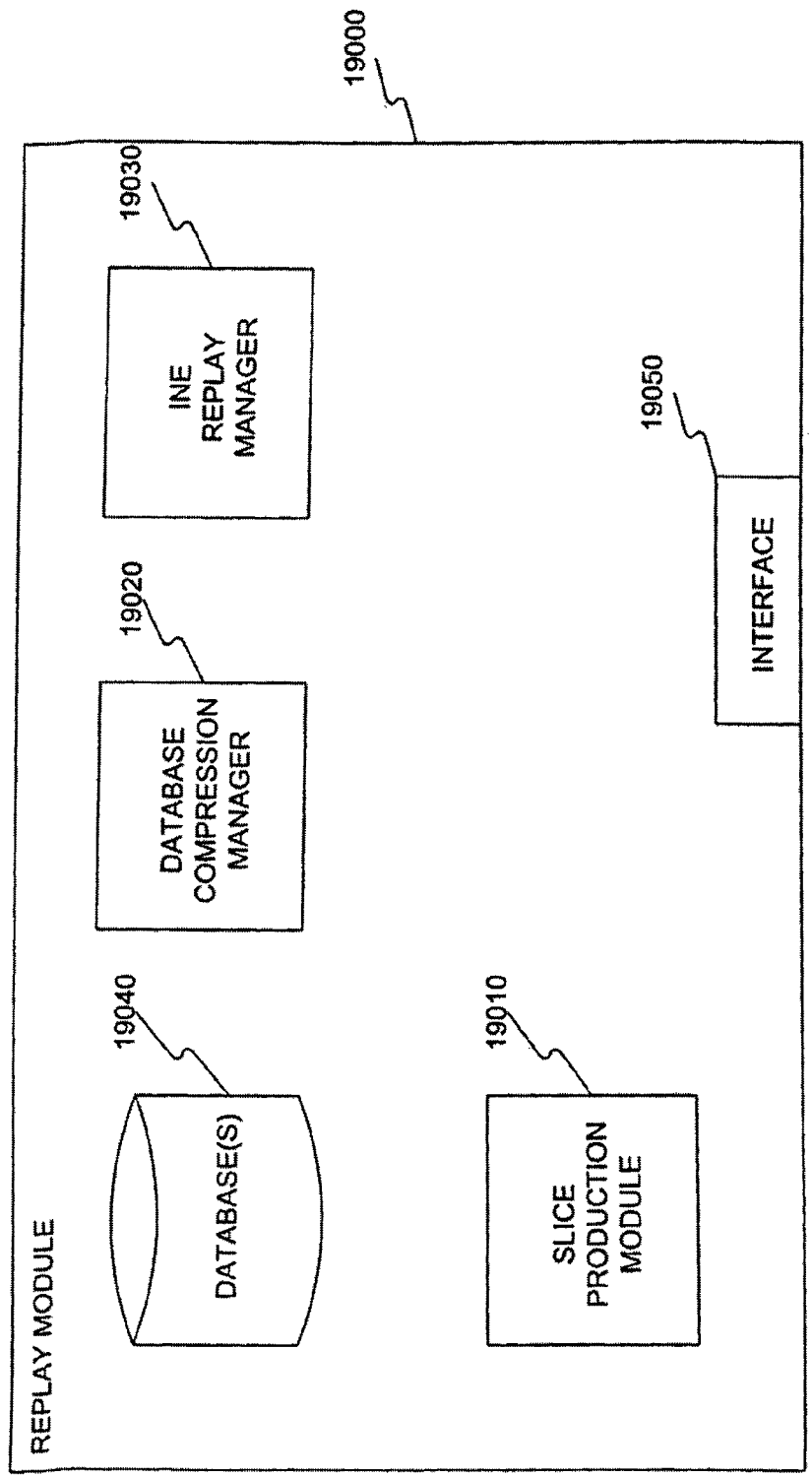
FIG. 19 depicts an exemplary module for performing a replay of network information.

FIG. 19 depicts an exemplary replay module 19000. Replay module 19000 includes a slice production module 19010, a database compression manager 19020, an INE replay manager 19030, one or more databases 19040, and an INE API 19050.

Slice production module 19010 functions to receive network information 20150 based on a schedule. For example, a user may select the periodic interval (time between slices t1, t2, and so on) to be once per day. When that is the case, slice production module 19010 may receive network information 20150 from one or more INEs through interface 19050. Moreover, if there is a network event, slice production module 19010 may receive topologically significant network information corresponding to that event. In some embodiments, events are defined by a user as either a topologically relevant event (e.g., packet loss exceeding a threshold, loss of a node, or link degradation) or non-topologically relevant event (e.g., node name change). User defined topologically relevant events are stored by module 19010 in database 19040 and provided to the INEs, so that the INEs can provide only the topologically relevant information during an event. By providing topologically relevant events, INE replay manager 19030 can determine the state of the network from the last periodic time slice. If there are multiple events, each event may be time stamped so that INE replay manager 19030 can sequentially process each event until the event of interest is processed—and its corresponding network state is determined. As used herein, a network state means network information 20150 at any given moment in time.

Database compression module 19020 functions to receive slices of network information (e.g., slices 20050 and 20051) and to archive the slices in database 19040. Moreover, module 19020 may periodically delete slices that are expired, such as old slices that are not likely to be of interest to a user.

INE replay manager 19030 functions to replay the slices stored in database 19040. For example, INE replay manager 19030 may receive the initial request from a user to replay an event, such as a node failure, or a specific time period (e.g., 10 minutes before the failure event). INE replay manager 19030 may gather any network information associated with the event, such as the network information before the event, from database 19040. In some embodiments, instead of gathering such information from database 19040, INE replay manager 19030 may query INEs for the network information. INE replay manager 19030 then determines the state of the network and provides a display of the network information, e.g., topology, performance, network objects, and inferred services.

Figure 20:
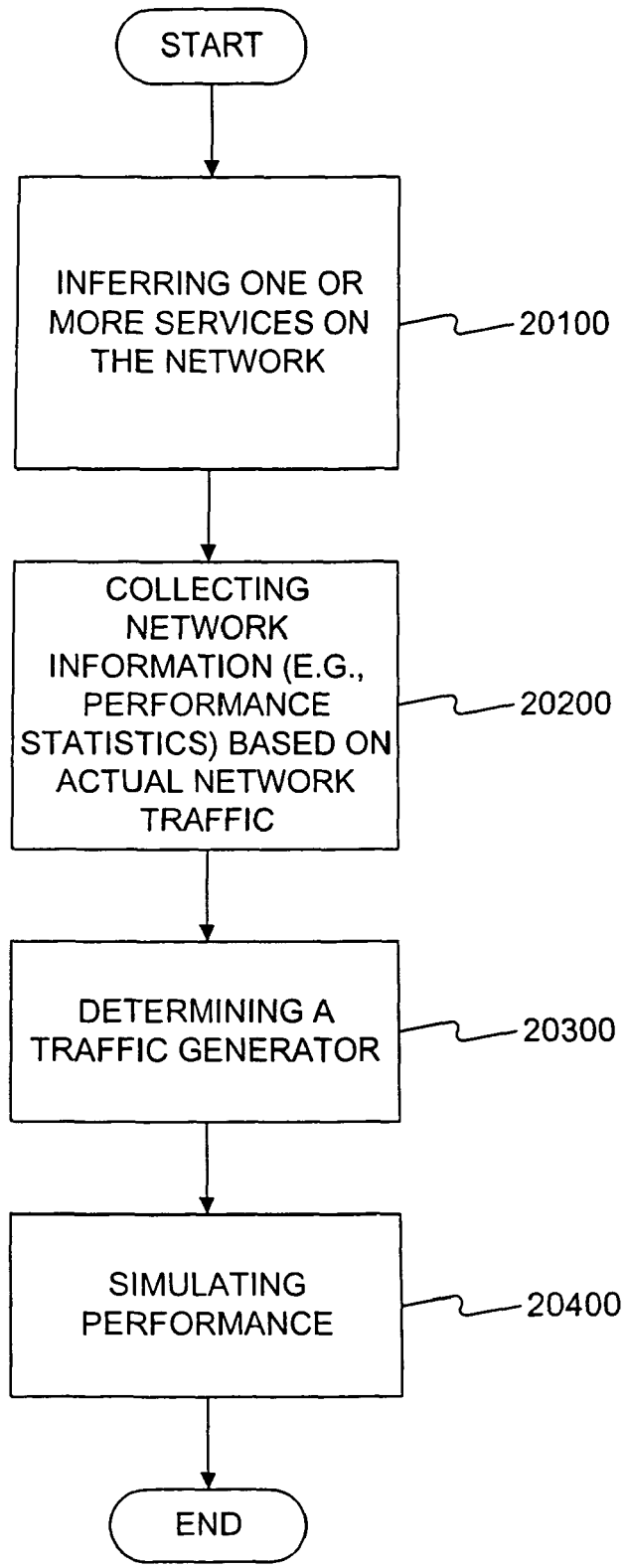
FIG. 20 depicts a flowchart with exemplary steps for determining a traffic generator.

FIG. 20 depicts exemplary steps simulating network performance based on a traffic generator consistent with the systems and methods of the present invention. Referring to FIGS. 10 and 20, NMS 175 may infer a service that may exist on network 4000 based on network objects, which are structured to serve as a model of network 4000 (20100). To infer a service that may exist on network 4000 (step 20100), NMS 175 may use the same methods described above with respect to steps 220 and/or 535. NMS 175 may also collect network information based on actual traffic in network 4000 (step 20200). NMS 175 may then determine a traffic generator that represents the actual traffic in the network corresponding to the inferred service (step 20300). Using the determined traffic generator, NMS 175 then simulates the performance of network 4000 (step 20400). With that basic description, the following provides a more detailed description of steps 20100-20400.

To collect network information based on actual traffic in network 4000 (step 20200), NMS 175 may use any approach to collect such information including, for example, an SNMP or CLI query of nodes A-F. Moreover, the information may include actual traffic information for the nodes and links of network 4000. Examples of traffic information (also known as traffic statistics or network performance parameters) include packet loss, jitter, latency, rate, peak rates, average rates, traffic shape statistics (e.g., bursty, continuous, voice, etc.), bandwidth, queue statistics, dropped packets, error packets, characteristic average, minimum and maximum packet sizes and size distributions. In some embodiments, NMS 175 may store actual traffic information in a database and the stored traffic information may be stored in a structured manner as described above with respect to FIG. 9. Furthermore, in some embodiments, the traffic information may be obtained using intelligent network probes, as described in co-pending U.S. application Ser. No. 10/903, 586, entitled, "Systems and Methods for Intelligent Probe Testing," filed Aug. 2, 2004. Although the traffic information may be collected for the entire network 4000, NMS 175 may only collect such information for the inferred service. For example, if a VPN associated with "Customer A" is the service, NMS 175 may only collect actual traffic information associated with "Customer A."

To determine a traffic generator that represents the actual traffic in the network corresponding to the inferred service (step 20300), NMS 175 may use the determined traffic corresponding to the inferred service. For example, Customer A may determine the actual traffic associated with tunnel 950 between nodes A 150 and F 454. Moreover, the actual traffic may indicate that node A has bursty traffic, with periodic 1 second bursts of packet data requiring 100 Megabits per seconds of peak bandwidth through nodes A and F and tunnel 950. NMS 175 then determines that the traffic generator for the "Customer A" service is a traffic generator for generating 1 second bursts at 100 Megabits per second. The aforementioned example is only illustrative, since any type of traffic generator may be determined, such as one that provides continuous traffic, one that provides a specific type of traffic, and/or one that satisfies SLAs at node A 150, allowing thus any packets generated by the packet generator to be injected into tunnel 950.

To simulate performance of the network (step 20400), NMS 175 may use a network simulator to simulate network 4000 using the determined traffic generator. Network simulation packages are known and commercially available. Although any type of simulation package can be used, in one embodiment, a behavioral simulation package is used to simulate network 4000. See for example "Simulation model for analysis of synchronous digital hierarchy network payload jitter," P. E. Sholander et al., Proceedings of the 3rd International Workshop on Modeling, Analysis, and Simulation (MASCOTS '95). Moreover, the network simulation can use information from model 350 (see, e.g., FIG. 9) of network 4000 to build the simulation of network 4000 including its nodes and interconnecting links.

Once the network is simulated, the traffic generator simulates the generation of packets using the determined traffic generator. By way of example, a network simulator may simulate the behavior of network 4000 to an input. When the traffic generator provides that input, such as a 10 Megabit per second burst of packets with a duration of 1 second, the network simulator simulates the behavior of each of the nodes A, D, and F including the corresponding links 474 and 475 and tunnel 950. Specifically, it simulates, for example, the inputs, queue lengths (e.g., packet wait times at a router), and outputs at each node. Since the nodes are simulated based on model 9000 and the input to the simulation is based on actual network traffic, the simulation of the network 4000 can provide a true representation of the behavior of network 4000, tunnel 950, and the service associated with that tunnel (namely, Customer A's VPN).

Furthermore, a user of the network simulation can generate a network event (e.g., remove a link or a node) and/or can change the topology (e.g., add or delete a node and any corresponding links). The user can then re-run the simulation of network 4000 with the network event and/or topology change. The simulation providing performance results associated with the event or change. These so-called "what-if" scenarios are useful for network planning. Moreover, since the simulation is performed off line, the actual network performance may not be impacted.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Moreover, the computer readable media may be in the form of a signal on a carrier wave or may be in the form of a storage media such as a disk. Examples of program instructions include, for example, machine code, such as produced by a compiler, and files containing a high level code that can be executed by the computer using an interpreter.

What is claimed is:

1. A method for simulating network performance, comprising:
    inferring one or more services on a network;
    collecting network information based on traffic on the network;
    determining a traffic generator that represents the traffic on the network from a perspective of at least one of the inferred services; and
    simulating performance of the network using the determined traffic generator.

2. The method of claim 1, wherein the simulating includes generating one or more events.

3. The method of claim 1, including changing a topology representative of the network.

4. The method of claim 3, including simulating performance of the network based on the changed topology.

5. The method of claim 3, wherein the changing includes adding a node.

6. A system for simulating network performance, comprising:
    means for inferring one or more services on a network;
    means for collecting network information based on traffic on the network;
    means for determining a traffic generator that represents the traffic on the network from a perspective of at least one of the inferred services; and
    means for simulating performance of the network using the determined traffic generator.

7. A computer readable media for simulating network performance, the computer readable media comprising code, said code comprising:
    code that infers one or more services on a network;
    code that collects network information based on traffic on the network;
    code that determines a traffic generator that represents the traffic on the network from a perspective of at least one of the inferred services; and
    code that simulates performance of the network using the determined traffic generator.

8. A system comprising:
    a network interface,
    a storage module, and
    a processing unit, operably coupled to the storage module and the network interface, that is configured to:
        infer one or more services on a network that is accessed via the network interface,
        collect network information based on actual traffic on the network, and
        generate simulated traffic that represents the actual traffic corresponding to at least one of the one or more inferred services on the network.

9. The system of claim 8, wherein the processing unit is configured to provide the simulated traffic to a network simulator.

10. The system of claim 8, wherein the storage module is configured to store traffic information corresponding to the actual traffic, and
    the processing unit is configured to generate the simulated traffic based on the stored traffic information.

11. The system of claim 10, wherein the traffic information is obtained using one or more intelligent network probes.

12. The system of claim 8, wherein the processing unit is configured to determine one or more measures of performance of the network based on the simulated traffic.

13. The system of claim 8, wherein the one or more services include one or more virtual private networks.

14. The system of claim 8, including at least one intelligent network element that is configured to collect topology information that facilitates the inferring of the one or more services on the network.

15. The system of claim 14, wherein the intelligent network element is configured to appear as a router to other network elements.

16. The system of claim 14, wherein the intelligent network element is configured to receive network information that includes an identification of interfaces at nodes of the network, and connections among nodes of the network.

17. The system of claim 14, wherein the at least one intelligent network element includes a plurality of hierarchically arranged intelligent network elements that are configured to facilitate a determination of a hierarchy of the network.

18. The system of claim 8, wherein the storage module is configured to store the actual traffic, and the processing unit is configured to generate the simulated traffic by providing at least a portion of the actual traffic from the storage module.

19. The method of claim 1, wherein inferring the one or more services includes determining interfaces of nodes on the network and connections among nodes of the network.

20. The method of claim 19, wherein determining the connections among nodes includes appearing as a router to the nodes.

21. The method of claim 1, wherein the one or more services include one or more virtual private networks.

* * * * *